US012572039B2

(12) United States Patent
Kadotani et al.

(10) Patent No.: US 12,572,039 B2
(45) Date of Patent: Mar. 10, 2026

(54) LIGHT MODULATION DEVICE AND PROJECTOR

(71) Applicant: SEIKO EPSON CORPORATION, Tokyo (JP)

(72) Inventors: Norikazu Kadotani, Azumino (JP); Takanori Fukuyama, Matsumoto (JP); Katsunori Tanaka, Azumino (JP); Minoru Moriwaki, Matsumoto (JP); Suguru Uchiyama, Suwa (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 18/377,021

(22) Filed: Oct. 5, 2023

(65) Prior Publication Data

US 2024/0027817 A1 Jan. 25, 2024

Related U.S. Application Data

(62) Division of application No. 17/706,043, filed on Mar. 28, 2022, now Pat. No. 11,829,019.

(30) Foreign Application Priority Data

Mar. 29, 2021 (JP) ................................. 2021-056134

(51) Int. Cl.
*G02F 1/1333* (2006.01)
*G03B 21/00* (2006.01)
*G03B 21/16* (2006.01)

(52) U.S. Cl.
CPC ..... *G02F 1/133385* (2013.01); *G03B 21/006* (2013.01); *G03B 21/16* (2013.01)

(58) Field of Classification Search
CPC .. G02F 1/133385; G03B 21/16; G03B 21/006
See application file for complete search history.

(56) References Cited

U.S. PATENT DOCUMENTS 5,032,021 A 7/1991 Kanatani et al.
8,083,355 B2 12/2011 Yanagisawa et al.
(Continued)

FOREIGN PATENT DOCUMENTS

CN 106604621 B * 4/2019
JP H03-126011 A 5/1991
(Continued)

OTHER PUBLICATIONS

U.S. Appl. No. 17/875,187, filed Jul. 27, 2022 in the name of Norikazu Kadotani.
May 11, 2023 Office Action issued in U.S. Appl. No. 17/875,187.

*Primary Examiner* — Jessica M Merlin
(74) *Attorney, Agent, or Firm* — Oliff PLC

(57) ABSTRACT

A light modulation device having a pixel arrangement region in which a plurality of pixels are arranged includes a first substrate, a second substrate disposed to be opposed to the first substrate via a liquid crystal layer, and a cooling member disposed on the opposite side of the first substrate with respect to the second substrate and thermally connected to the second substrate. The cooling member includes a hollow space in which working fluid is encapsulated and changes the working fluid in a liquid phase to the working fluid in a gas phase to cool the liquid crystal layer via the second substrate.

9 Claims, 20 Drawing Sheets

(56)　　　　　References Cited

U.S. PATENT DOCUMENTS

| | | | |
|---|---|---|---|
| 2005/0117077 A1* | 6/2005 | Utsunomiya | G03B 21/16 349/5 |
| 2007/0206158 A1* | 9/2007 | Kinoshita | G03B 21/16 353/54 |
| 2008/0174741 A1 | 7/2008 | Yanagisawa et al. | |
| 2013/0083268 A1* | 4/2013 | Hirabayashi | H04N 9/3105 353/30 |
| 2015/0181764 A1 | 6/2015 | Honmura et al. | |
| 2019/0116343 A1 | 4/2019 | Nakamura et al. | |
| 2019/0129237 A1* | 5/2019 | Nishi | G03B 21/16 |
| 2019/0250454 A1 | 8/2019 | Chauveau et al. | |
| 2021/0018821 A1 | 1/2021 | Sugiyama | |
| 2021/0026189 A1 | 1/2021 | Fujikawa | |
| 2021/0089078 A1 | 3/2021 | Ito | |
| 2021/0095930 A1 | 4/2021 | Inagaki et al. | |
| 2021/0242188 A1* | 8/2021 | Kim | H05K 1/0209 |

| | | | |
|---|---|---|---|
| 2021/0341823 A1 | 11/2021 | Nishi et al. | |
| 2022/0283463 A1 | 9/2022 | Fujikawa | |

FOREIGN PATENT DOCUMENTS

| | | |
|---|---|---|
| JP | H09-022013 A | 1/1997 |
| JP | 2002-107698 A | 4/2002 |
| JP | 2004-272088 A | 9/2004 |
| JP | 2007-294655 A | 11/2007 |
| JP | 2008-089722 A | 4/2008 |
| JP | 2008-197344 A | 8/2008 |
| JP | 2009-271467 A | 11/2009 |
| JP | 2015-121355 A | 7/2015 |
| JP | 2018-017963 A | 2/2018 |
| JP | 2019-074695 A | 5/2019 |
| JP | 2021-018308 A | 2/2021 |
| JP | 2021-018367 A | 2/2021 |
| JP | 2021-047311 A | 3/2021 |
| TW | I711798 B | 12/2020 |
| WO | 2005100897 A1 | 10/2005 |

* cited by examiner

LIGHT MODULATION DEVICE AND PROJECTOR

The present application is a division of application Ser. No. 17/706,043, filed Mar. 28, 2022. The present application is based on, and claims priority from JP Application Serial Number 2021-056134, filed Mar. 29, 2021, the disclosure of which is hereby incorporated by reference herein in its entirety.

BACKGROUND

1. Technical Field

The present disclosure relates to a light modulation device and a projector.

2. Related Art

There has been known a liquid crystal projector including a cooling fan that circulates cooling air and a liquid crystal display element cooled by the cooling air (see, for example, JP-A-2002-107698 (Patent Literature 1)).

There has been known electronic equipment including a cooling system that cools a heat generating body with a circulated liquid coolant (see, for example, JP-A-2007-294655 (Patent Literature 2)). The cooling system described in Patent Literature 2 includes a tank that stores the liquid coolant, a pump that feeds the liquid coolant stored in the tank, a heat receiving part that transmits heat absorbed from the heat generating body to the liquid coolant fed by the pump, and a heat radiating part that radiates the heat transmitted to the liquid coolant and cools the liquid coolant. The liquid coolant cooled by the heat radiating part is stored in the tank. Consequently, the liquid coolant circulates in the cooling system.

In recent years, a reduction in the size of a projector has been demanded. In response to the demand, it is conceivable to reduce the projector in size by adopting a small light modulation device and reducing a projection optical device in size. However, in the small light modulation device, it is likely that heat density increases according to an increase in light density in the light modulation device and the light modulation device is not sufficiently cooled.

When the cooling air is circulated to cool the light modulation device as in the liquid crystal projector described in Patent Literature 1, it is necessary to increase an air quantity of the cooling air in order to sufficiently cool the light modulation device. In contrast, adoption of a large cooling fan leads to an increase in the size of the projector. If the cooling fan is driven at high speed, noise increases.

In the cooling system described in Patent Literature 2, for example, it is necessary to adopt a large pump in order to increase a feeding quantity of the liquid coolant. This leads to an increase in the size of the cooling system and an increase in the size of the projector.

Accordingly, there has been a demand for a light modulation device that can improve cooling efficiency even when being reduced in size.

SUMMARY

Alight modulation device according to a first aspect of the present disclosure is a light modulation device including a pixel arrangement region in which a plurality of pixels are arranged. The light modulation device includes: a first substrate; a second substrate disposed to be opposed to the first substrate via a liquid crystal layer; and a cooling member disposed on an opposite side of the first substrate with respect to the second substrate and thermally connected to the second substrate. The cooling member includes a hollow space in which working fluid is encapsulated and changes the working fluid in a liquid phase to the working fluid in a gas phase to cool the liquid crystal layer via the second substrate.

A projector according to a second aspect of the present disclosure includes: the light modulation device according to the first aspect configured to modulate light emitted from a light source; and a projection optical device configured to project the light modulated by the light modulation device.

A projector according to a third aspect of the present disclosure includes: the light modulation device according to the first aspect configured to modulate light emitted from a light source; a projection optical device configured to project the light modulated by the light modulation device; and a cooling device configured to circulate a cooling gas to the cooling member. The cooling device includes a first circulating part configured to circulate the cooling gas in a first direction from the pixel arrangement region toward a first heat radiating member.

BRIEF DESCRIPTION OF THE DRAWINGS

FIG. 3 is an exploded perspective view showing a light modulation device and a holding member according to the first embodiment.

FIG. 18 is a perspective view showing a cooling member and a second dustproof member of a light modulation device included in a projector according to a third embodiment.

DESCRIPTION OF EXEMPLARY EMBODIMENTS

First Embodiment

Figure 1:
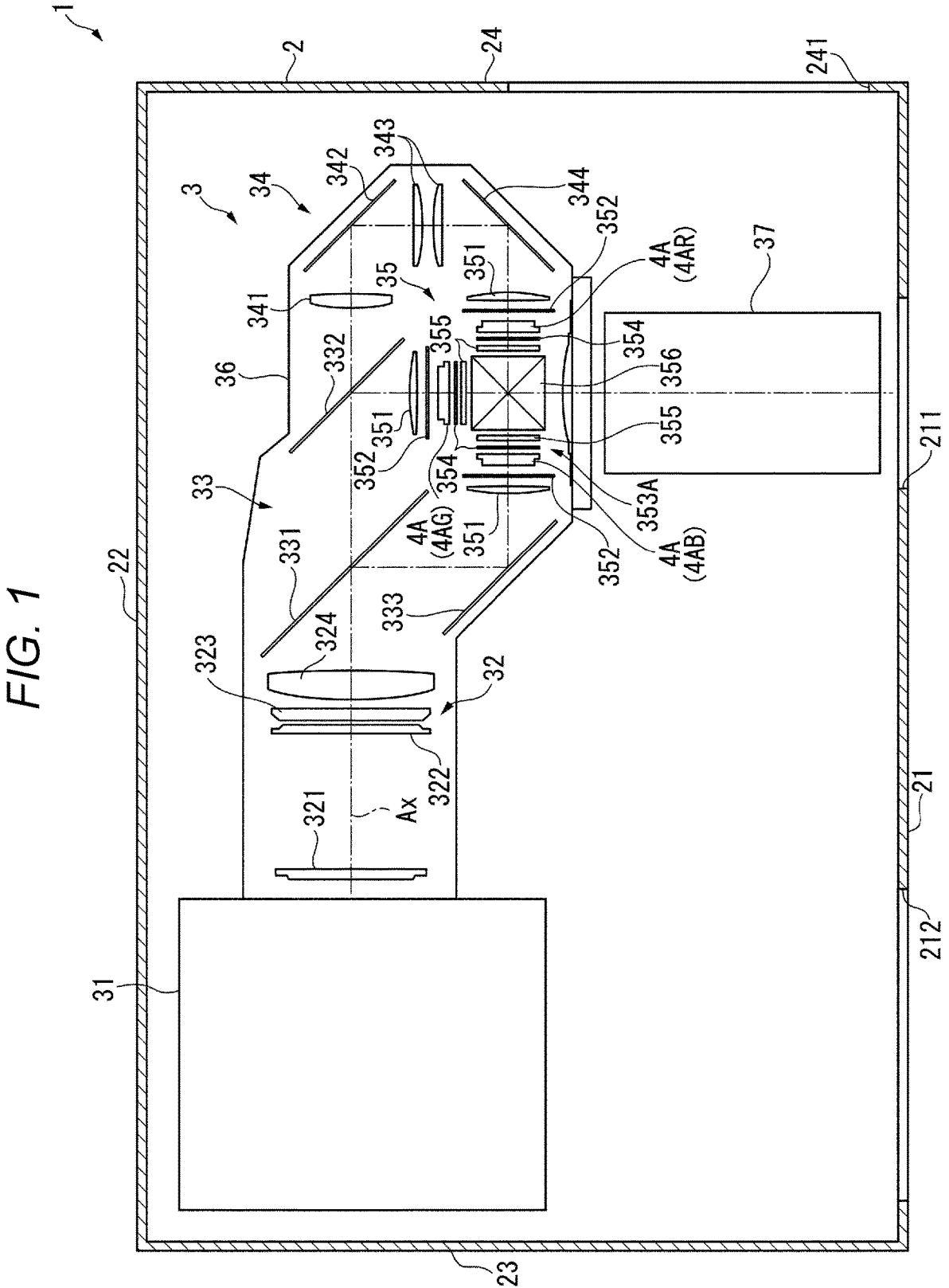
FIG. 1 is a schematic diagram showing the configuration of a projector according to a first embodiment.

A first embodiment of the present disclosure is explained below with reference to the drawings.
Schematic Configuration of a Projector FIG. 1 is a schematic diagram showing the configuration of a projector 1 according to this embodiment.

The projector 1 according to this embodiment modulates light emitted from a light source to form an image corresponding to image information and enlarges and projects the formed image onto a projection surface such as a screen. The projector 1 includes, as shown in FIG. 1, an exterior housing 2 and an image projection device 3. Besides, although not illustrated, the projector 1 includes a cooling device 7A (see FIG. 12) that cools cooling targets configuring the projector 1, a power supply device that supplies electric power to electronic components configuring the projector 1, and a control device that controls the operation of the projector 1.
Configuration of the Exterior Housing The exterior housing 2 configures the exterior of the projector 1 and houses the image projection device 3, the cooling device 7A, the power supply device, and the control device on the inside.

The exterior housing 2 includes a front surface 21, a rear surface 22, a left side surface 23, and a right side surface 24. Although not illustrated, the exterior housing 2 includes a top surface connecting one end portions in the surfaces 21 to 24 and a bottom surface connecting the other end portions in the surfaces 21 to 24. The exterior housing 2 is formed in, for example, a substantially rectangular parallelepiped shape.

The right side surface 24 includes an air intake port 241. The air intake port 241 introduces air on the outside of the exterior housing 2 into the inside of the exterior housing 2 as a cooling gas. A filter that collects dust included in the air passing through the air intake port 241 may be provided in the air intake port 241.

The front surface 21 includes a passage port 211 located substantially in the center in the front surface 21. Light projected from a projection optical device 37 explained below passes through the passage port 211.

The front surface 21 includes an exhaust port 212 located on the left side surface 23 side in the front surface 21. The exhaust port 212 discharges the cooling gas having cooled the cooling targets provided in the exterior housing 2 to the outside of the exterior housing 2.
Configuration of the Image Projection Device The image projection device 3 forms an image corresponding to image information input from the control device and projects the formed image. The image projection device 3 includes a light source 31, a uniformizing system 32, a color separating system 33, a relay system 34, an image forming system 35, a housing for optical components 36, and a projection optical device 37.

The light source 31 emits illumination light to the uniformizing system 32. As the configuration of the light source 31, for example, a configuration including a solid-state light source that emits blue light, which is excitation light, and a wavelength conversion elements that converts a part of the blue light emitted from the solid-state light source into fluorescent light including green light and red light can be illustrated. As other configurations of the light source 31, a configuration including a light source lamp such as an ultrahigh pressure mercury lamp as a light source can be illustrated and a configuration including solid-state light sources that individually emit the blue light, the green light, and the red light can be illustrated.

The uniformizing system 32 uniformizes light emitted from the light source 31. The uniformized light illuminates a modulation region of a light modulation device 4A explained below through the color separating system 33 and the relay system 34. The uniformizing system 32 includes two lens arrays 321 and 322, a polarization conversion element 323, and a superimposing lens 324.

The color separating system 33 separates light made incident from the uniformizing system 32 into color lights of red, green, and blue. The color separating system 33 includes two dichroic mirrors 331 and 332 and a reflection mirror 333 that reflects the blue light separated by the dichroic mirror 331.

The relay system 34 is provided in an optical path of the red light longer than optical paths of the other color lights and suppresses a loss of the red light. The relay system 34 includes an incident side lens 341, a relay lens 343, and reflection mirrors 342 and 344. In this embodiment, the relay system 34 is provided on the optical path of the red light. However, not only this, but, for example, color light having an optical path longer than the optical paths of the other color lights may be the blue light and the relay system 34 may be provided on the optical path of the blue light.

The image forming system 35 modulates the color lights of red, green, and blue made incident thereon, combines the modulated color lights, and forms an image. The image forming system 35 includes three field lenses 351 and three incident side polarizing plates 352 and an image forming unit 353A, the field lenses 351 and the incident side polarizing plates 352 being provided to correspond to the color lights made incident thereon.

The image forming unit 353A includes three light modulation devices 4A, three viewing angle compensator 354, three emission side polarizing plates 355, and one color combining system 356 and is obtained by integrating the light modulation devices 4A, the viewing angle compensators 354, the emission side polarizing plates 355, and the color combining system 356.

The light modulation devices 4A modulate, according to image information, light emitted from the light source 31. Specifically, the light modulation devices 4A modulate lights emitted from the incident side polarizing plates 352 and form an image corresponding to image information. The light modulation devices 4A include a light modulation device 4AR that modulates the red light, a light modulation device 4AG that modulates the green light, and a light modulation device 4AB that modulates the blue light. The light modulation devices 4A are configured by transmissive liquid crystal panels. Liquid crystal light valves are configured by the incident side polarizing plates 352, the light modulation devices 4A, and the emission side polarizing plates 355.

A detailed configuration of the light modulation devices 4A is explained in detail below.

The color combining system 356 combines the three color lights modulated by the light modulation devices 4AB, 4AG, and 4AR to form an image and emits the formed image to the projection optical device 37. In this embodiment, the color combining system 356 is configured by a cross dichroic prism having a substantially rectangular parallelepiped shape. The cross dichroic prism is, for example, a prism having a substantially rectangular parallelepiped shape obtained by sticking together four prisms having a right angled triangular prism shape. Two dielectric multilayer films crossing each other are provided on interfaces of the four prisms.

Figure 2:
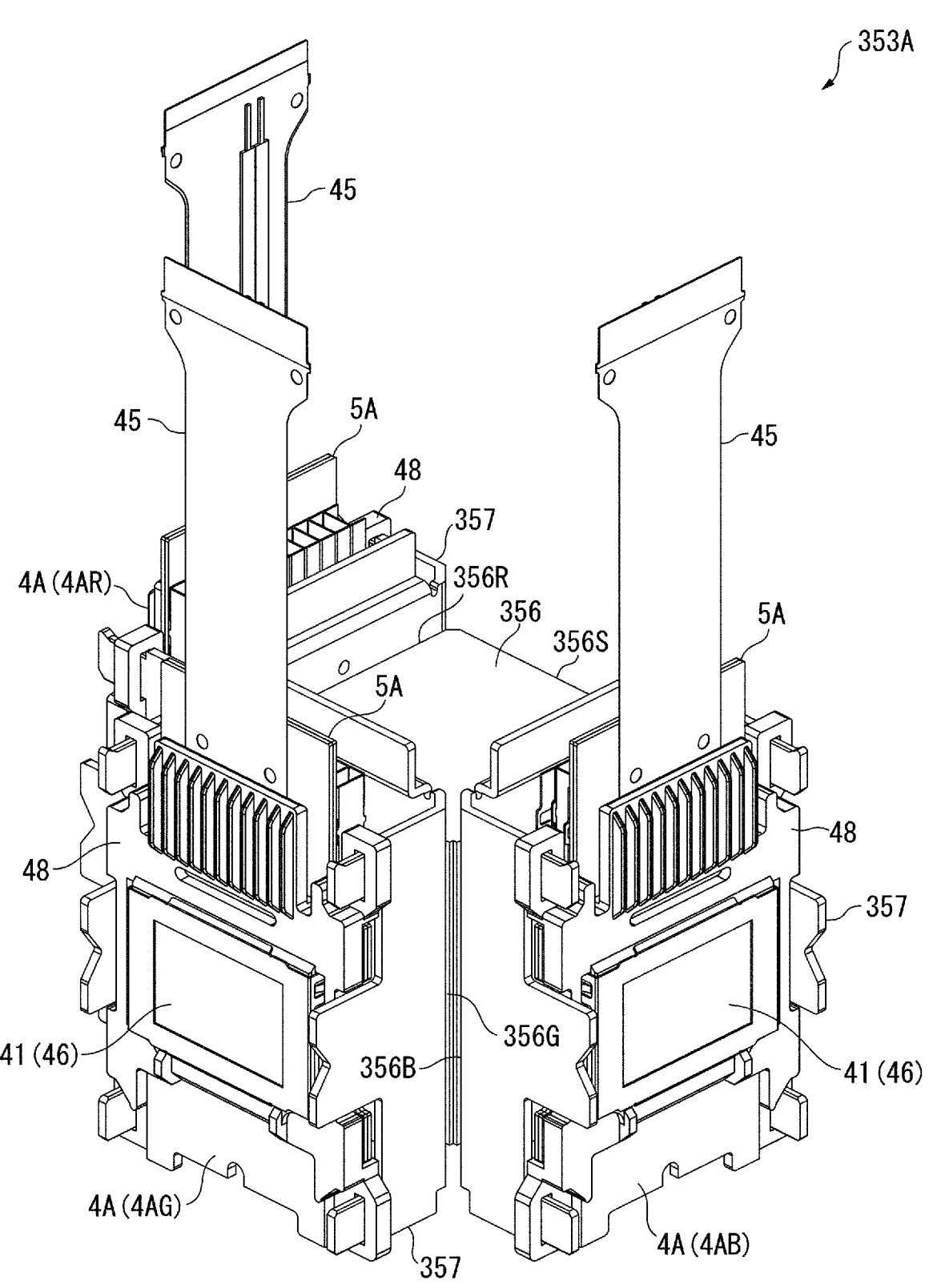
FIG. 2 is a perspective view showing an image forming unit according to the first embodiment.

FIG. 2 is a perspective view showing the image forming unit 353A.

The color combining system 356 includes, as shown in FIG. 2, three incident surfaces 356R, 356G, and 356B that are opposed to the light modulation devices 4AR, 4AG, and 4AB and on which the color lights having passed through the light modulation devices 4AR, 4AG, and 4AB are made incident and one emission surface 356S. Among the three color lights made incident on the incident surface 356R, 356G, and 356B, the blue light and the red light are reflected to the projection optical device 37 side by the two dielectric multilayer films and the green light passes through the two dielectric multilayer films to the projection optical device 37 side. Consequently, the three color lights are combined and image light is formed. The formed image light is emitted from the emission surface 356S and made incident on the projection optical device 37.

As shown in FIG. 2, the image forming unit 353A includes three holding members 357 besides the components explained above.

Each of the three holding members 357 holds the light modulation device 4A and the emission side polarizing plate 355 and is fixed to an incident surface corresponding thereto among the incident surfaces 356R, 356G, and 356R.

Figure 3:
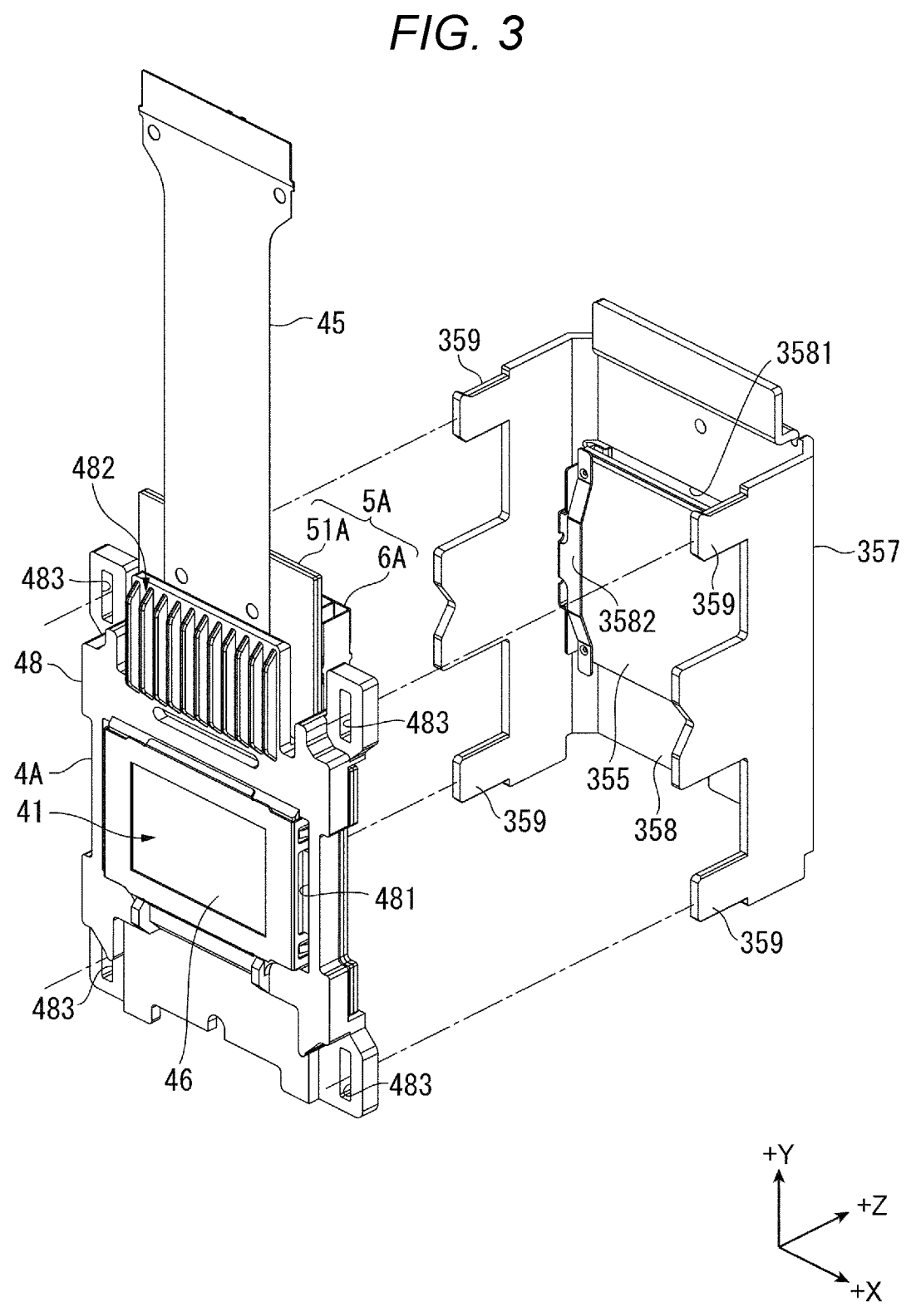
Figure 4:
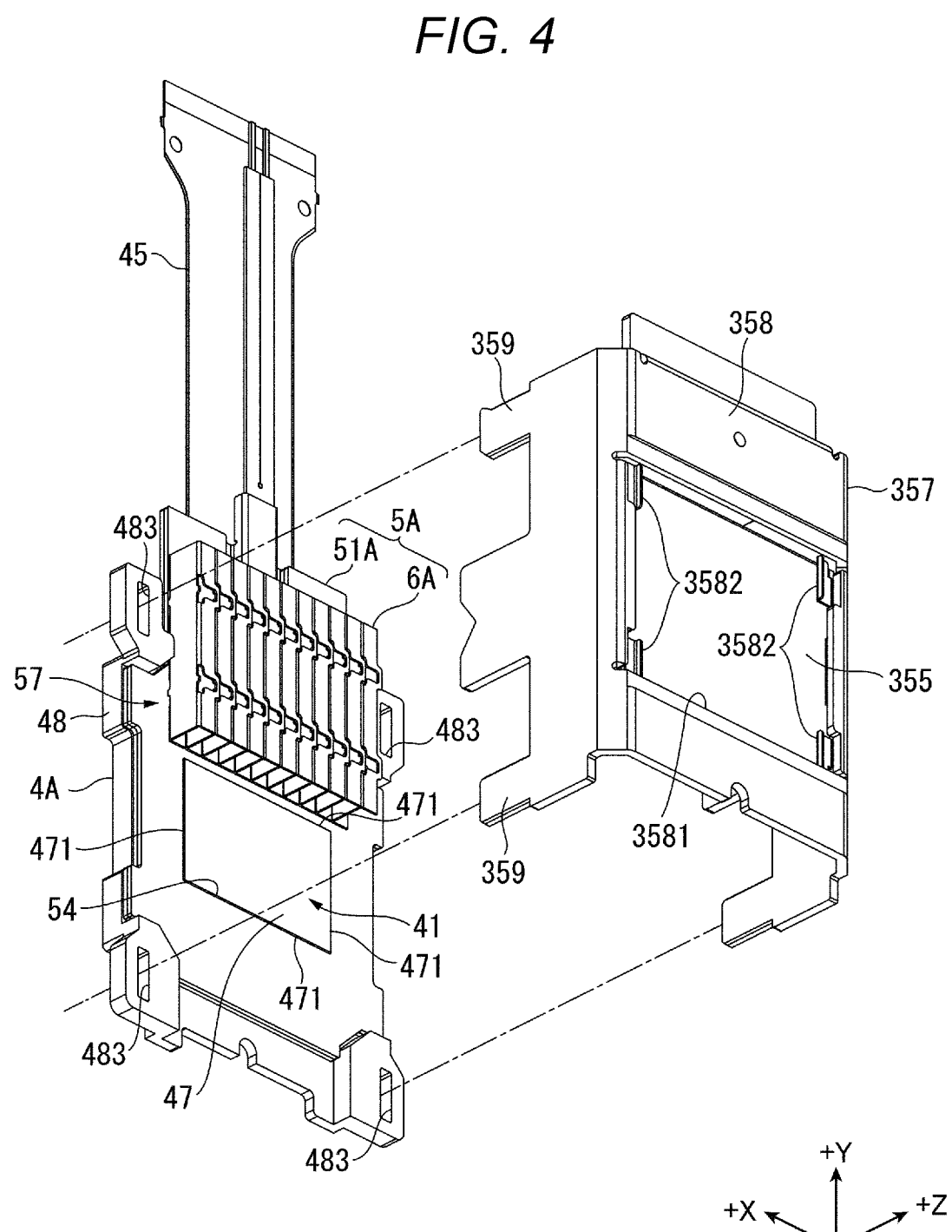
FIG. 4 is an exploded perspective view showing the light modulation device and the holding member according to the first embodiment.

FIG. 3 is an exploded perspective view of the light modulation device 4A and the holding member 357 viewed from a light incident side of the light modulation device 4A. FIG. 4 is an exploded perspective view of the light modulation device 4A and the holding member 357 viewed from a light emission side of the light modulation device 4A.

The holding member 357 includes an attaching part 358 and four inserting parts 359.

The attaching part 358 is formed in a rectangular frame shape and attached to the corresponding incident surface by bonding or the like. The attaching part 358 includes an opening 3581 and a holding part 3582.

The opening 3581 is formed in a rectangular shape substantially in the center of the attaching part 358. Light having passed through the emission side polarizing plate 355 passes through the opening 3581 toward the color combining system 356.

The holding part 3582 holds the emission side polarizing plate 355.

The four inserting parts 359 project to the light modulation device 4A side from portions corresponding to four corners in the attaching part 358. The four inserting parts 359 are inserted into position adjusting parts 483 of the light modulation device 4A and, thereafter, bonded and fixed to the light modulation device 4A by an adhesive such as an ultraviolet curing adhesive.

The light modulation device 4A is integrated with the color combining system 356 by such a holding member 357. However, the color combining system 356 may be configured by, for example, a plurality of dichroic mirrors without being limited to be configured by the cross dichroic prims having the substantially rectangular parallelepiped shape.

As shown in FIG. 2, the housing for optical components 36 houses the systems 32 to 34 and the field lenses 351 explained above on the inside. In the image projection device 3, an illumination light axis Ax, which is an optical axis in design, is set. The housing for optical components 36 hold the systems 32 to 34 and the field lenses 351 in predetermined positions on the illumination light axis Ax. The light source 31, the image forming unit 353A, and the projection optical device 37 are disposed in predetermined positions on the illumination light axis Ax.

The projection optical device 37 is a projection lens that enlarges and projects an image made incident from the image forming system 35 onto the projection surface. That is, the projection optical device 37 projects light modulated by the light modulation device 4A. As the projection optical device 37, a group lens including a plurality of lenses and a tubular lens barrel in which the plurality of lenses are housed can be illustrated.

Configuration of the Light Modulation Device

As explained above, the light modulation device 4A is the transmissive liquid crystal panel that modulates the light made incident from the incident side polarizing plate 352 and is disposed in the position corresponding to each of the incident surfaces of the color combining system 356 by the holding member 357. The light modulation device 4A includes, as shown in FIGS. 3 and 4, a panel main body 41, a printed board 45, a first dustproof member 46, a second dustproof member 47, a holding housing 48, and a cooling member 5A.

In the following explanation, three directions orthogonal to one another are represented as a +X direction, a +Y direction, and a +Z direction. In this embodiment, the +Z direction is a traveling direction of light made incident on the light modulation device 4A. A right direction in the case in which the light modulation device 4A is viewed along the +Z direction such that the +Y direction coincides with the upward direction is the +X direction. Although not illustrated, the opposite direction of the +X direction is represented as a −X direction, the opposite direction of the +Y direction is represented as a −Y direction, and the opposite direction of the +Z direction is represented as a −Z direction. That is, the +Z direction with respect to the light modulation device 4A is a light emission side with respect to the light modulation device 4A and the −Z direction with respect to the light modulation device 4A is a light incident side with respect to the light modulation device 4A.

Configuration of the Panel Main Body

Figure 5:
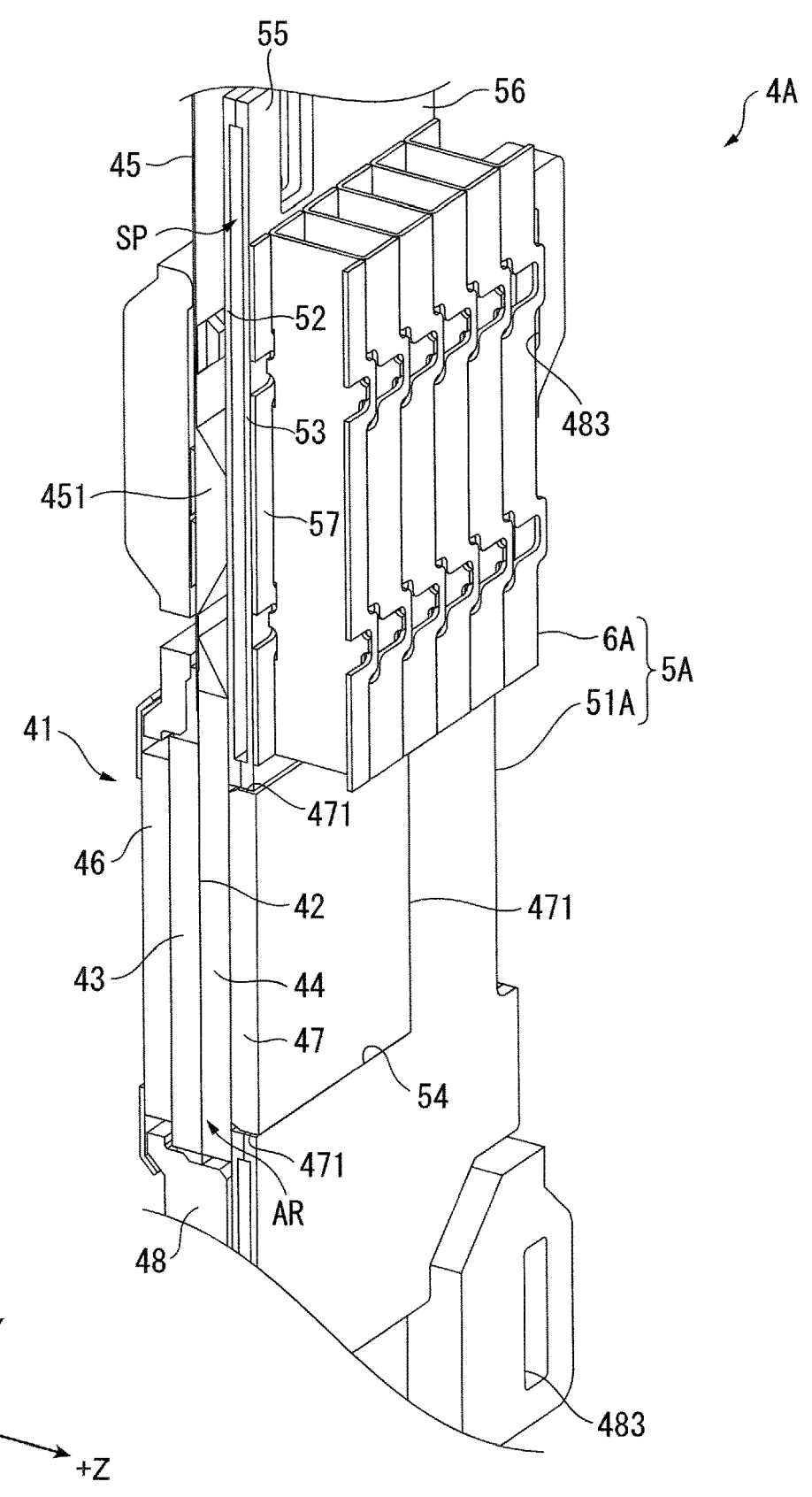
FIG. 5 is a sectional view showing the light modulation device according to the first embodiment.

FIG. 5 is a sectional view showing the light modulation device 4A.

The panel main body 41 modulates light made incident thereon. The panel main body 41 includes, as shown in FIG. 5, a liquid crystal layer 42, a first substrate 43, and a second substrate 44.

The liquid crystal layer 42 is formed of liquid crystal encapsulated between the first substrate 43 and the second substrate 44. The liquid crystal layer 42 modulates, according to a voltage applied by the first substrate 43 or the second substrate 44, light made incident via the first dustproof member 46.

Heat is generated in the liquid crystal layer 42 by the incidence of the light. The heat generated in the liquid crystal layer 42 is transmitted to the first substrate 43 and the second substrate 44 sandwiching the liquid crystal layer 42.

The first substrate 43 is disposed in the −Z direction with respect to the liquid crystal layer 42. The second substrate 44 is disposed in the +Z direction with respect to the liquid crystal layer 42. That is, the second substrate 44 is disposed to be opposed to the first substrate 43 via the liquid crystal layer 42. In other words, the first substrate 43 is disposed on a light incident side with respect to the liquid crystal layer 42 and the second substrate 44 is disposed on a light emission side with respect to the liquid crystal layer 42.

One substrate of the first substrate 43 and the second substrate 44 is a counter substrate on which a common electrode is provided. The other substrate is an element substrate on which a plurality of switching elements such as TFTs (Thin Film Transistors) are provided. The first substrate 43 and the second substrate 44 are light transmissive substrates capable of transmitting light.

The liquid crystal layer 42, the first substrate 43, and second substrate 44 configure a pixel arrangement region AR on which a plurality of pixels are arranged. That is, the light modulation device 4A includes the pixel arrangement region AR on which the plurality of pixels are arranged.
Configuration of the Printed Board The printed board 45 extends in the +Y direction from the first substrate 43 and the second substrate 44 and is connected to a not-shown control device. The printed board 45 drives the panel main body 41 according to an image signal input from the control device. The printed board 45 includes a driver circuit 451 that controls the operation of the panel main body 41.

The driver circuit 451 is a circuit element provided on the printed board 45. The driver circuit 451 is disposed on the surface of the printed board 45 in the +Z direction. The surface of the driver circuit 451 in the +Z direction is thermally connected to a heat receiving substrate 52 of the cooling member 5A.
Configurations of the First Dustproof Member and the Second Dustproof Member The first dustproof member 46 is provided in a portion of the first substrate 43 corresponding to the pixel arrangement region AR on the surface of the first substrate 43 in the −Z direction. That is, when the light modulation device 4A is viewed from the −Z direction, the first dustproof member 46 covers the pixel arrangement region AR.

The second dustproof member 47 is provided in a portion of the second substrate 44 corresponding to the pixel arrangement region AR on the surface of the second substrate 44 in the +Z direction. That is, when the light modulation device 4A is viewed from the +Z direction, the second dustproof member 47 covers the pixel arrangement region AR. The second dustproof member 47 is equivalent to the light transmissive substrate according to the present disclosure and is fit in an opening 54 of the cooling member 5A.

The first dustproof member 46 and the second dustproof member 47 are light transmissive substrates having a substantially rectangular shape when viewed from the +Z direction. The first dustproof member 46 and the second dustproof member 47 suppress dust from adhering to the panel main body 41 and suppresses the shadow of the dust from being included in light modulated by the panel main body 41.
Configuration of the Holding Housing The holding housing 48 covers the panel main body 41, a part of the printed board 45, and the first dustproof member 46 in the −Z direction. The holding housing 48 is combined with the cooling member 5A to thereby hold the panel main body 41 and the first dustproof member 46 on the inside.

That is, the holding housing 48 is separate from a main body 51A of the cooling member 5A explained below. The holding housing 48 includes an opening 481 and heat radiating fins 482 as shown in FIG. 3 and includes four position adjusting parts 483 as shown in FIGS. 3 and 4.

As shown in FIG. 3, the opening 481 is provided in a substantially rectangular shape according to the pixel arrangement region AR when viewed from the −Z direction. The opening 481 allows light emitted from the incident side polarizing plate 352 to pass and makes the light incident on the first dustproof member 46.

A plurality of heat radiating fins 482 are provided to project in the −Z direction from portions in the +Y direction with respect to the opening 481. The heat radiating fins 482 radiate heat transmitted from the first substrate 43 and the first dustproof member 46 to the holding housing 48.

As shown in FIGS. 3 and 4, the four position adjusting parts 483 are provided at four corners of the holding housing 48 when viewed from the −Z direction. The position adjusting parts 483 are holes into which the inserting parts 359 corresponding thereto are inserted from the +Z direction. The position of the holding housing 48 with respect to the incident surface of the color combining system 356 to which the holding member 357 is attached and the position of the light modulation device 4A are adjusted according to an insertion amount of the inserting parts 359 into the position adjusting parts 483. After the position adjustment for the light modulation device 4A, as explained above, the inserting parts 359 and the position adjusting parts 483 are fixed by the adhesive.
Configuration of the Cooling Member The cooling member 5A is disposed on the opposite side of the first substrate 43 with respect to the second substrate 44 and thermally connected to the second substrate 44. As shown in FIG. 5, the cooling member 5A includes a hollow space SP in which working fluid is incapsulated. The cooling member 5A changes the working fluid in a liquid phase to the working fluid in a gas phase with heat transmitted from a thermally connected heat generating body to thereby cool the heat generating body. In this embodiment, the cooling member changes the working fluid in the liquid phase to the working fluid in the gas phase with heat transmitted from the liquid crystal layer 42 via the second substrate 44 and the second dustproof member 47 to thereby cool the liquid crystal layer 42. That is, the cooling member 5A cools the liquid crystal layer 42 via the second substrate 44 with vaporization of the working fluid.

The cooling member 5A includes a main body 51A and a first heat radiating member 6A.
Configuration of the Main Body FIG. 6 is a perspective view showing the main body 51A.

Figure 6:
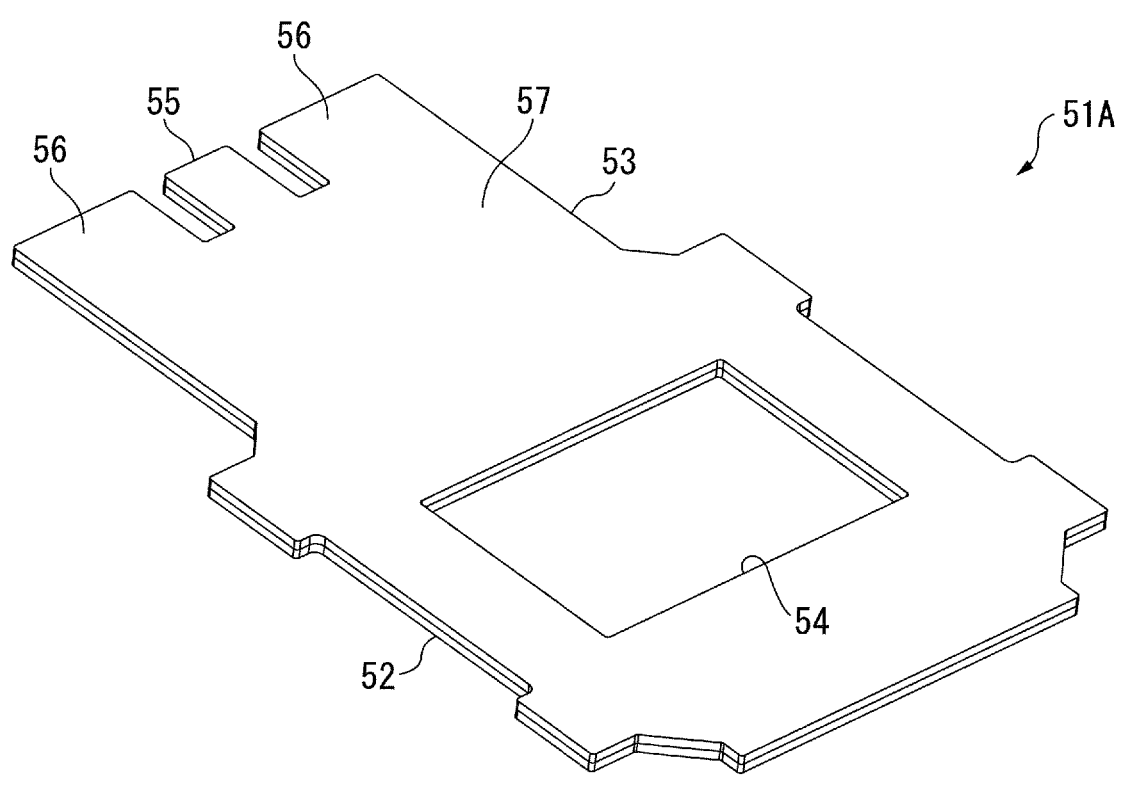
FIG. 6 is a perspective view showing a main body of a cooling member according to the first embodiment.
Figure 6:
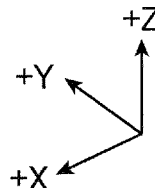

The main body 51A includes, as shown in FIG. 6, a heat receiving substrate 52 disposed in the −Z direction and a heat radiating substrate 53 disposed in the +Z direction. The main body 51A is configured by combining the heat receiving substrate 52 and the heat radiating substrate 53. In this embodiment, the main body 51A is configured by a vapor chamber. The hollow space SP (see FIG. 5) in which the working fluid is encapsulated is formed on the inside of the main body 51A.

Figure 7:
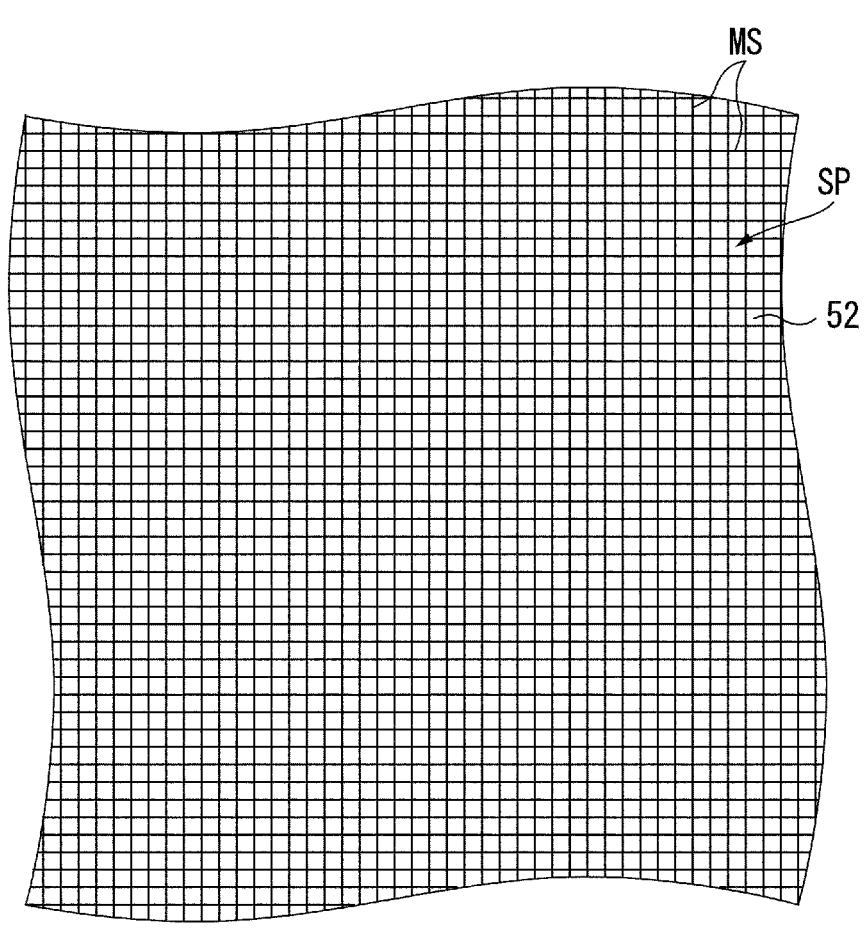
FIG. 7 is a schematic diagram showing an inner surface of a heat receiving substrate according to the first embodiment.
Figure 7:
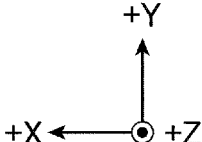

FIG. 7 is a schematic diagram showing an inner surface opposed to the heat radiating substrate 53 on the heat receiving substrate 52.

The heat receiving substrate 52 is connected to the second substrate 44 and changes the working fluid in the liquid phase to the working fluid in the gas phase with heat transmitted from the second substrate 44.

Specifically, the heat receiving substrate 52 is formed in a flat shape. The surface in the −Z direction on the heat receiving substrate 52 is connected to the surface in the +Z direction in the second substrate 44. The heat receiving substrate 52 has a mesh structure MS provided in the hollow space SP. As shown in FIG. 7, the mesh structure MS is provided on the surface of the heat receiving substrate 52 opposed to the heat radiating substrate 53.

The working fluid in the liquid phase encapsulated in the decompressed hollow space SP soaks into the mesh structure MS. The mesh structure MS transports the soaked working fluid in the liquid phase to a portion to which heat is transmitted from the outside on the heat receiving substrate 52.

The heat receiving substrate 52 changes the working fluid in the liquid phase to the working fluid in the gas phase with the heat transmitted from the outside, for example, the heat of the liquid crystal layer 42 transmitted from the second substrate 44 and the second dustproof member 47. That is, the heat receiving substrate 52 evaporates the working fluid in the liquid phase with the transmitted heat. The working fluid changed to the gas phase in this way circulates in channels formed on the heat radiating substrate 53.

Figure 8:
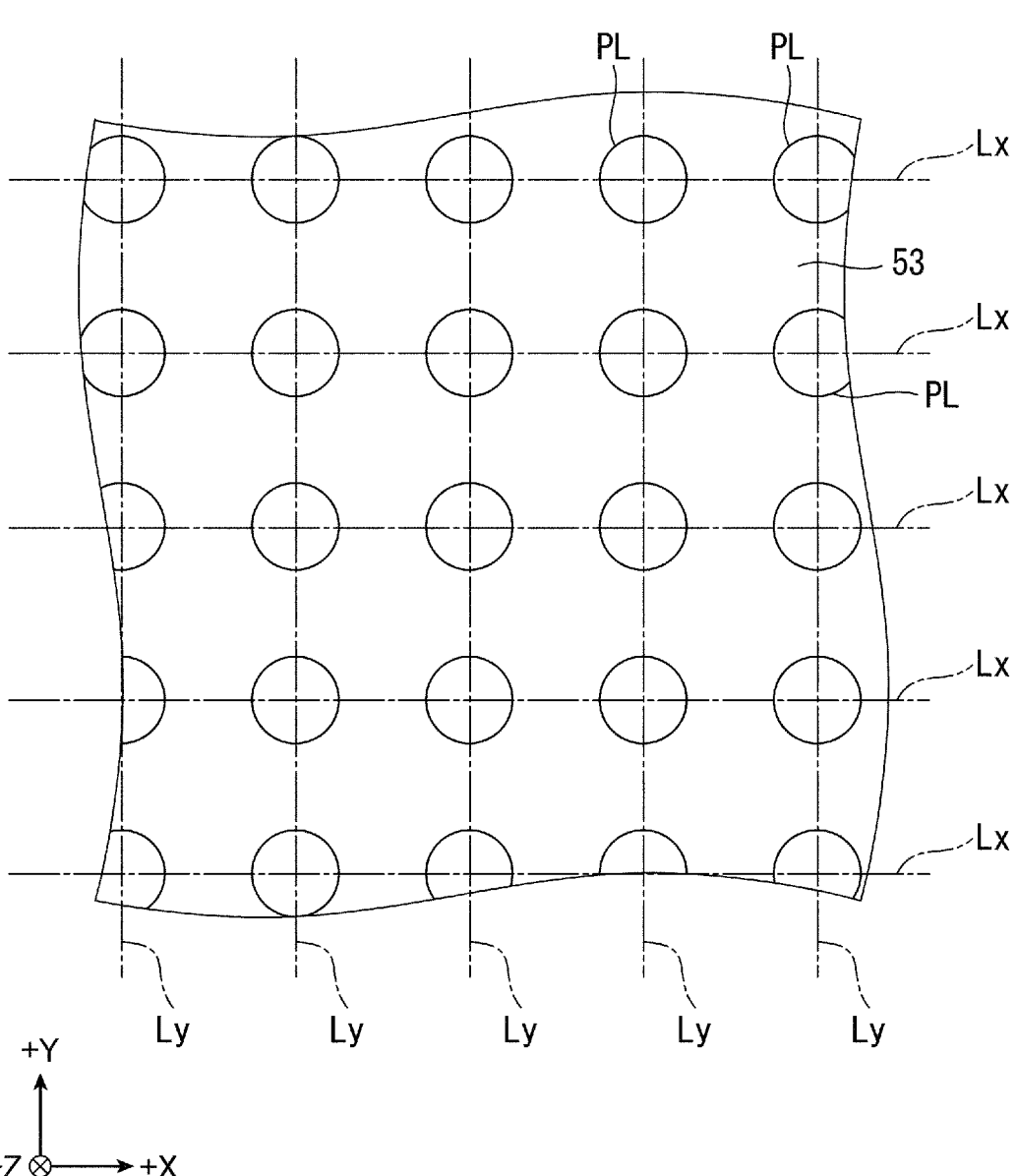
FIG. 8 is a schematic diagram showing an inner surface of a heat radiating substrate according to the first embodiment.

FIG. 8 is a schematic diagram showing the inner surface of the heat radiating substrate 53 opposed to the heat receiving substrate 52. In FIG. 8, a part of a plurality of columnar bodies PL provided on the inner surface of the heat radiating substrate 53 are denoted by the reference sign.

The heat radiating substrate 53 is joined to the heat receiving substrate 52 on the opposite side of the second substrate 44 with respect to the heat receiving substrate 52 to form the hollow space SP in conjunction with the heat receiving substrate 52. The heat radiating substrate 53 radiates the heat of the working fluid in the gas phase and condenses the working fluid in the gas phase into the working fluid in the liquid phase.

As shown in FIG. 6, the heat radiating substrate 53 is formed in the same flat shape as the flat shape of the heat receiving substrate 52. As shown in FIG. 8, the plurality of columnar bodies PL are provided on the inner surface of the heat radiating substrate 53 opposed to the heat receiving substrate 52. That is, the heat radiating substrate 53 includes the plurality of columnar bodies PL provided in the hollow space SP.

The plurality of columnar bodies PL secure the strength of the main body 51A and forms a channel in which the working fluid in the gas phase generated in the hollow space SP circulates.

In an example shown in FIG. 8, the plurality of columnar bodies PL are disposed along the +X direction at predetermined intervals and are disposed along the +Y direction at predetermine intervals. That is, in the example shown in FIG. 8, the plurality of columnar bodies PL are disposed in crossing parts of a plurality of first imaginary lines Lx extending along the +X direction and set at equal intervals in the +Y direction and a plurality of second imaginary lines Ly extending along the +Y direction and set at equal intervals in the +X direction. However, a layout of the plurality of columnar bodies PL is not limited to this and may be other layouts.

Figure 9:
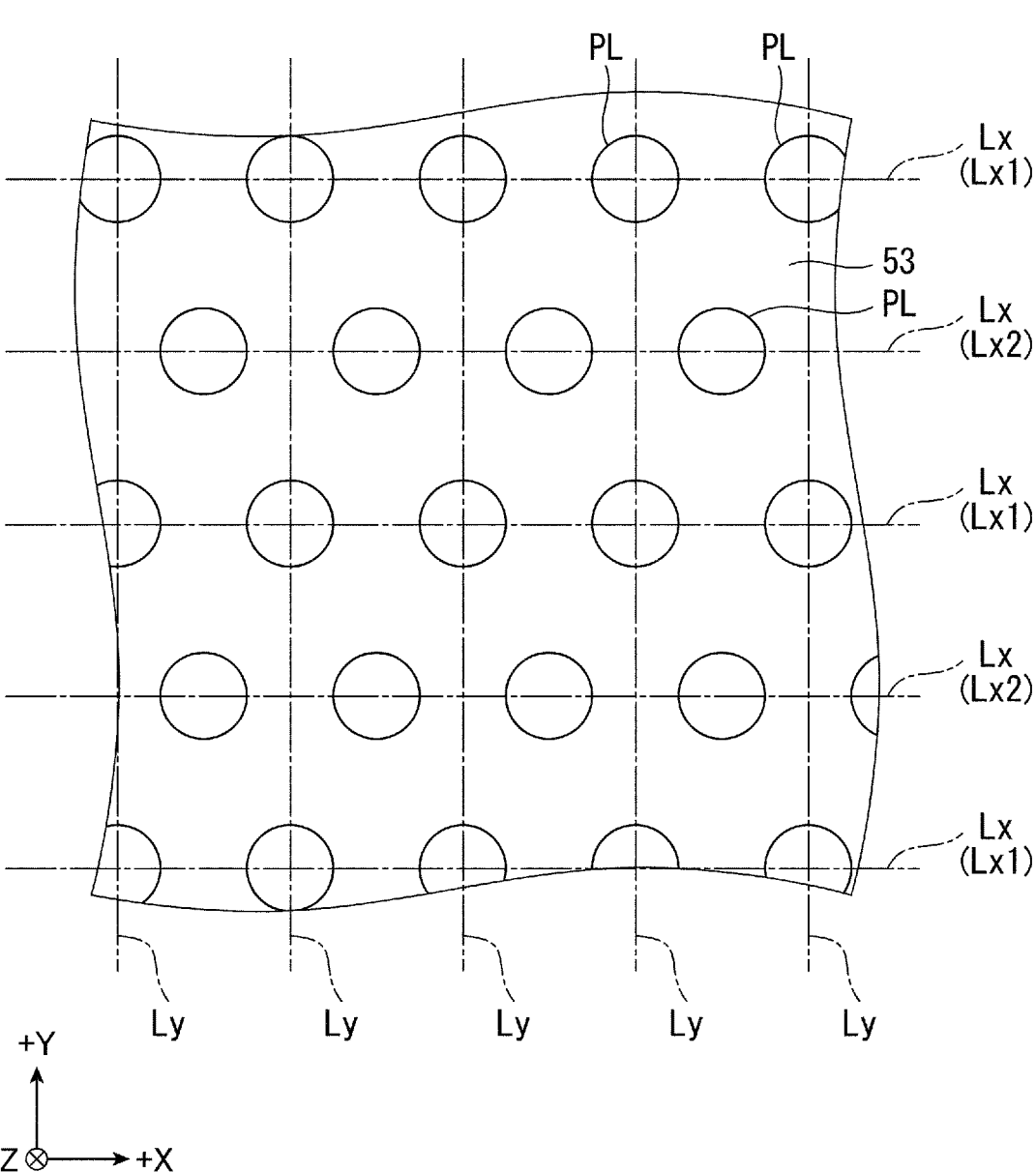
FIG. 9 is a schematic diagram showing another layout of a plurality of columnar bodies according to the first embodiment.

FIG. 9 is a schematic diagram showing another layout of the plurality of columnar bodies PL. In FIG. 9, only a part of the plurality of columnar bodies PL are denoted by the reference sign.

For example, as shown in FIG. 9, the plurality of columnar bodies PL are disposed at intersections of odd number-th first imaginary lines Lx1 among the plurality of first imaginary lines Lx extending along the +X direction and set at equal intervals in the +Y direction and the plurality of second imaginary lines Ly extending along the +Y direction and set at equal intervals in the +X direction and are disposed on even number-th first imaginary lines Lx2 among the plurality of first imaginary lines Lx and between two second imaginary lines Ly adjacent to each other. That is, in an example shown in FIG. 9, the plurality of columnar bodies PL disposed on the even number-th first imaginary lines Lx2 deviate in the +X direction or the −X direction with respect to the plurality of columnar bodies PL disposed on the odd number-th first imaginary lines Lx1.

The layout of the columnar bodies PL shown in FIG. 8 can be adopted, for example, when the dimension in the +Z direction of the main body 51A is relatively large. In such a layout, since a gap between the columnar bodies PL can be increased in size, a channel for the working fluid in the gas phase can be secured.

The layout of the columnar bodies PL shown in FIG. 9 can be adopted, for example, when the dimension in the +Z direction of the main body 51A is relatively small. In such a main body 51A, the dimension in the +Z direction of the hollow space SP in which the working fluid is encapsulated is also small. Accordingly, by adopting the layout of the columnar bodies PL shown in FIG. 9, it is possible to secure channels for the working fluid in the gas phase while increasing the strength against a shock applied to the main body 51A along the +Z direction or the −Z direction.

The main body 51A includes, as shown in FIG. 6, an opening 54, an encapsulating part 55, protecting parts 56, and a first condensing part 57.

The opening 54 is a substantially rectangular opening piercing through the main body 51A in the +Z direction. The second dustproof member 47 is fit in the inside of the opening 54. That is, the inner edge of the opening 54 is thermally connected to side surfaces of the second dustproof member 47. The side surfaces of the second dustproof member 47 are end faces excluding a surface in the −Z direction, which is a light incident surface, and a surface in the +Z direction, which is a light emission surface, among the outer surfaces of the second dustproof member 47.

In this embodiment, the inner edge of the opening 54 is formed by a joining portion of the heat receiving substrate 52 and the heat radiating substrate 53. Accordingly, the heat transmitted from the liquid crystal layer 42 to the second dustproof member 47 via the second substrate 44 is transmitted to the heat receiving substrate 52 from end faces 471 of the second dustproof member 47. Consequently, a part of the working fluid in the liquid phase encapsulated in the hollow space SP is converted into the working fluid in the gas phase and the heat transmitted to the heat receiving substrate 52 is consumed.

The encapsulating part 55 is provided at the end portion in the +Y direction in the main body 51A. The encapsulating part 55 is a portion for injecting the working fluid into the hollow space SP of the main body 51A. The encapsulating part 55 is sealed after the working fluid is encapsulated in the hollow space SP.

The protecting parts 56 are provided in positions sandwiching the encapsulating part 55 in the +X direction. The end portions in the +Y direction in the protecting parts 56 are disposed further in the +Y direction than the end portion in the +Y direction in the encapsulating part 55. Therefore, even when some shock is applied to the main body 51A from the +Y direction, the encapsulating part 55 can be protected by the protecting parts 56.

The first condensing part 57 discharges the heat of the working fluid in the gas phase circulating in the hollow space SP to thereby condense the working fluid in the gas phase into the working fluid in the liquid phase. The first condensing part 57 is provided on the heat radiating substrate 53 and disposed between the opening 54 and the encapsulating part 55. The first heat radiating member 6A (see FIG. 4) is provided on the outer surface in the +Z direction of the heat radiating substrate 53 corresponding to the first condensing part 57.

The first heat radiating member 6A radiates the heat transmitted from the working fluid in the gas phase. Since the first heat radiating member 6A is provided, the first condensing part 57 easily radiates the heat transmitted from the working fluid in the gas phase to the outside of the cooling member 5A. In other words, the first condensing part 57 is a part of the heat radiating substrate 53 that receives the heat from the working fluid in the gas phase and changes the working fluid in the gas phase to the working fluid in the liquid phase and easily radiates the received heat to the outside of the cooling member 5A. Therefore, in the cooling member 5A, a portion where the first heat radiating member 6A is provided is configured as the first condensing part 57.

Configuration of the First Heat Radiating Member

Figure 10:
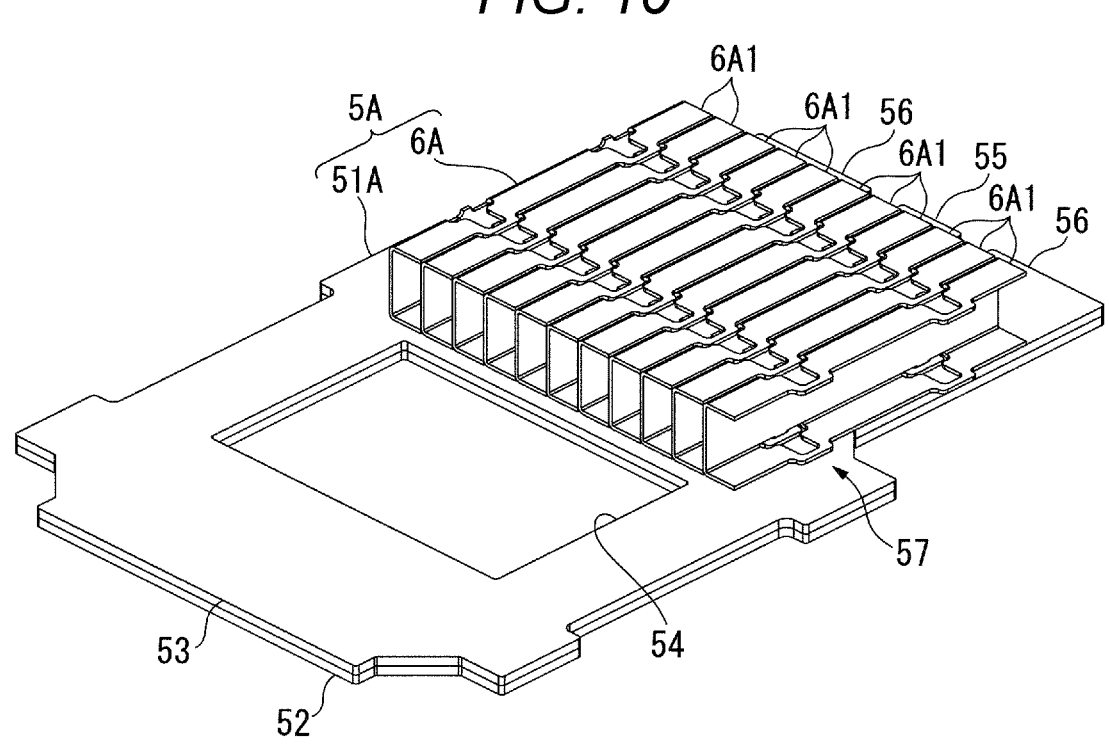
FIG. 10 is a perspective view showing a first heat radiating member attached to a main body according to the first embodiment.
Figure 10:
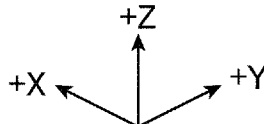

FIG. 10 is a perspective view showing the first heat radiating member 6A attached to the main body 51A.

The first heat radiating member 6A is provided in a portion corresponding to the first condensing part 57 on the outer surface in the +Z direction of the heat radiating substrate 53. That is, the first heat radiating member 6A is provided on the outer surface of the heat radiating substrate 53 corresponding to the first condensing part 57. The first heat radiating member 6A includes a plurality of fins 6A1 that radiate heat transmitted from the first condensing part 57.

In this embodiment, in the plurality of fins 6A1, channels, through which the cooling gas passes, are provided along the +Y direction in order to make it easy to transmit heat to the cooling gas circulating along the +Y direction from the −Y direction with a cooling fan 71 of the cooling device 7A explained below.

Specifically, each of the fins 6A1 is a tube body having a shape without one side surface in a substantially square tube body. The sectional shape of the fin 6A1 orthogonal to an extending direction of the fin 6A1 is a substantial U shape. The first heat radiating member 6A is configured by the plurality of fins 6A1 extending along the +Y direction and being coupled along the +X direction.

Figure 11:
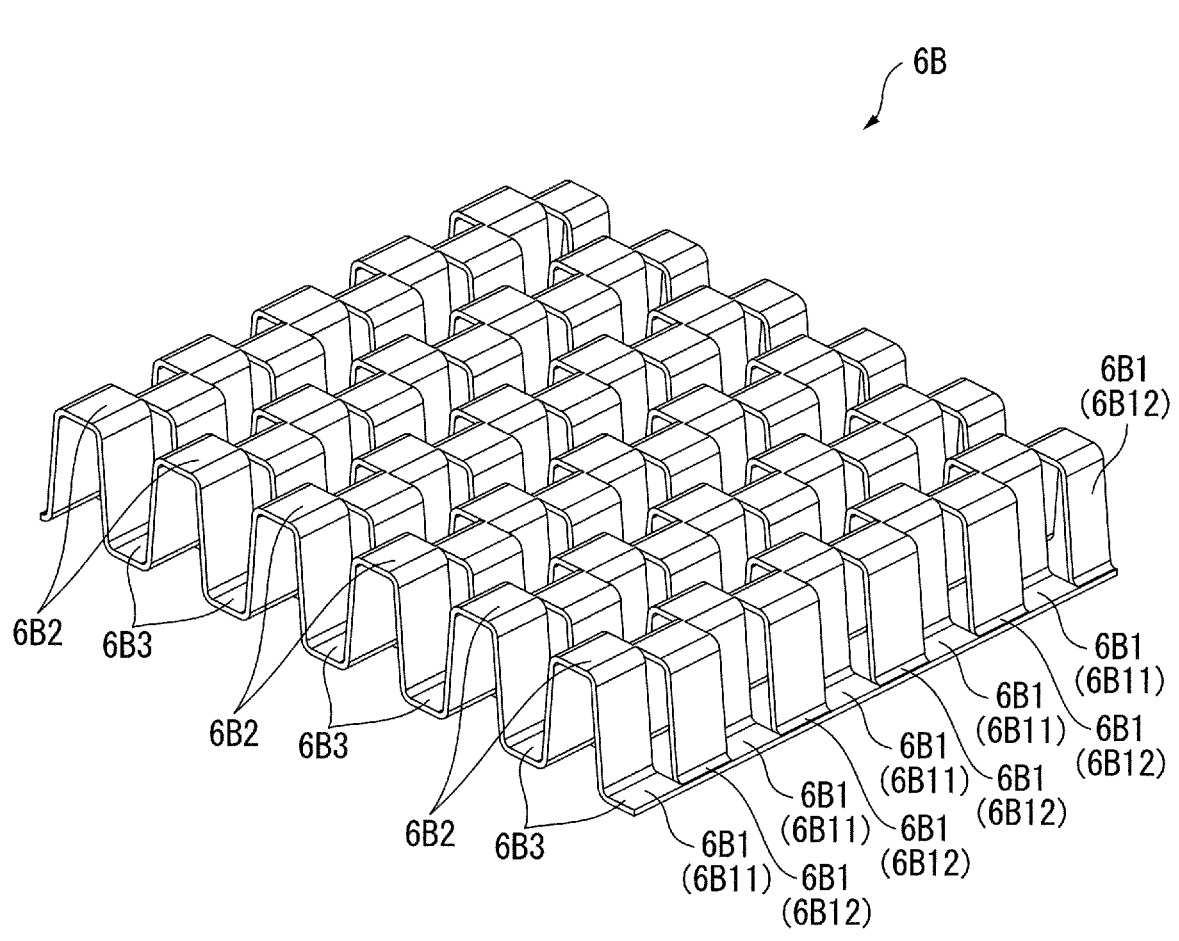
FIG. 11 is a perspective view showing a modification of the first heat radiating member according to the first embodiment.
Figure 11:
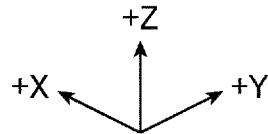

FIG. 11 is a perspective view showing a first heat radiating member 6B, which is a modification of the first heat radiating member 6A.

Heat radiating fins attached to the heat radiating substrate 53 are not limited to the first heat radiating member 6A. For example, the first heat radiating member 6B shown in FIG. 11 may be adopted instead of the first heat radiating member 6A.

The first heat radiating member 6B has a configuration in which a plurality of fins 6B1 extending along the +X direction are arrayed in the +Y direction. That is, the first heat radiating member 6B includes the plurality of fins 6B1 extending along the +X direction and arrayed in the +Y direction.

The fin 6B1 includes a plurality of projecting parts 6B2 provided at equal intervals in the +X direction and a flat part 6B3 provided between one projecting part 6B2 among the plurality of projecting parts 6B2 and the projecting part 6B2 adjacent to the one projecting part 6B2.

The projecting part 6B2 is a portion projecting in a substantial U shape in the +Z direction. The cooling gas can circulate on the inside of the projecting part 6B2.

The flat part 6B3 is a portion extending along an XY plane and connects the end portions in the −Z direction in two projecting parts 6B2 adjacent to each other in the +X direction.

In the first heat radiating member 6B, odd number-th fins 6B11 and even number-th fins 6B12 in the +Y direction are coupled to each other to deviate in the +X direction. That is, when viewed from the +Y direction or the −Y direction, the projecting parts 6B2 of the odd number-th fins 6B11 and the projecting parts 6B2 of the even number-th fins 6B12 do not completely overlap. Similarly, when viewed from the +Y direction or the −Y direction, the flat parts 6B3 of the odd number-th fins 6B11 and the flat parts 6B3 of the even number-th fins 6B12 do not completely overlap. In other words, when viewed from the +Y direction or the −Y direction, the projecting parts 6B2 of the odd number-th fins 6B11 are disposed to extend across the projecting parts 6B2 and the flat parts 6B3 of the even number-th fins 6B12. Similarly, when viewed from the +Y direction or the −Y direction, the projecting parts 6B2 of the even number-th fins 6B12 are disposed to extend across the projecting parts 6B2 and the flat parts 6B3 of the odd number-th fins 6B11.

Therefore, a part of the cooling gas circulating along the +Y direction with respect to the first heat radiating member 6B circulates to the projecting parts 6B2 of the odd number-th fins 6B11 and the projecting parts 6B2 and the flat parts 6B3 of the even number-th fins 6B12. The remaining part of the cooling gas circulating along the +Y direction with respect to the first heat radiating member 6B circulates to the flat parts 6B3 of the odd number-th fins 6B11 and the projecting parts 6B2 and the flat parts 6B3 of the even number-th fins 6B12.

Such a first heat radiating member 6B has a relatively large surface area that is in contact with the cooling gas. Accordingly, it is possible to improve heat radiation efficiency of the heat transmitted from the first condensing part 57 to the cooling gas, that is, transmission efficiency of the heat to the cooling gas. Consequently, it is possible to improve cooling efficiency of the liquid crystal layer 42.

Configuration of the Cooling Device

Figure 12:
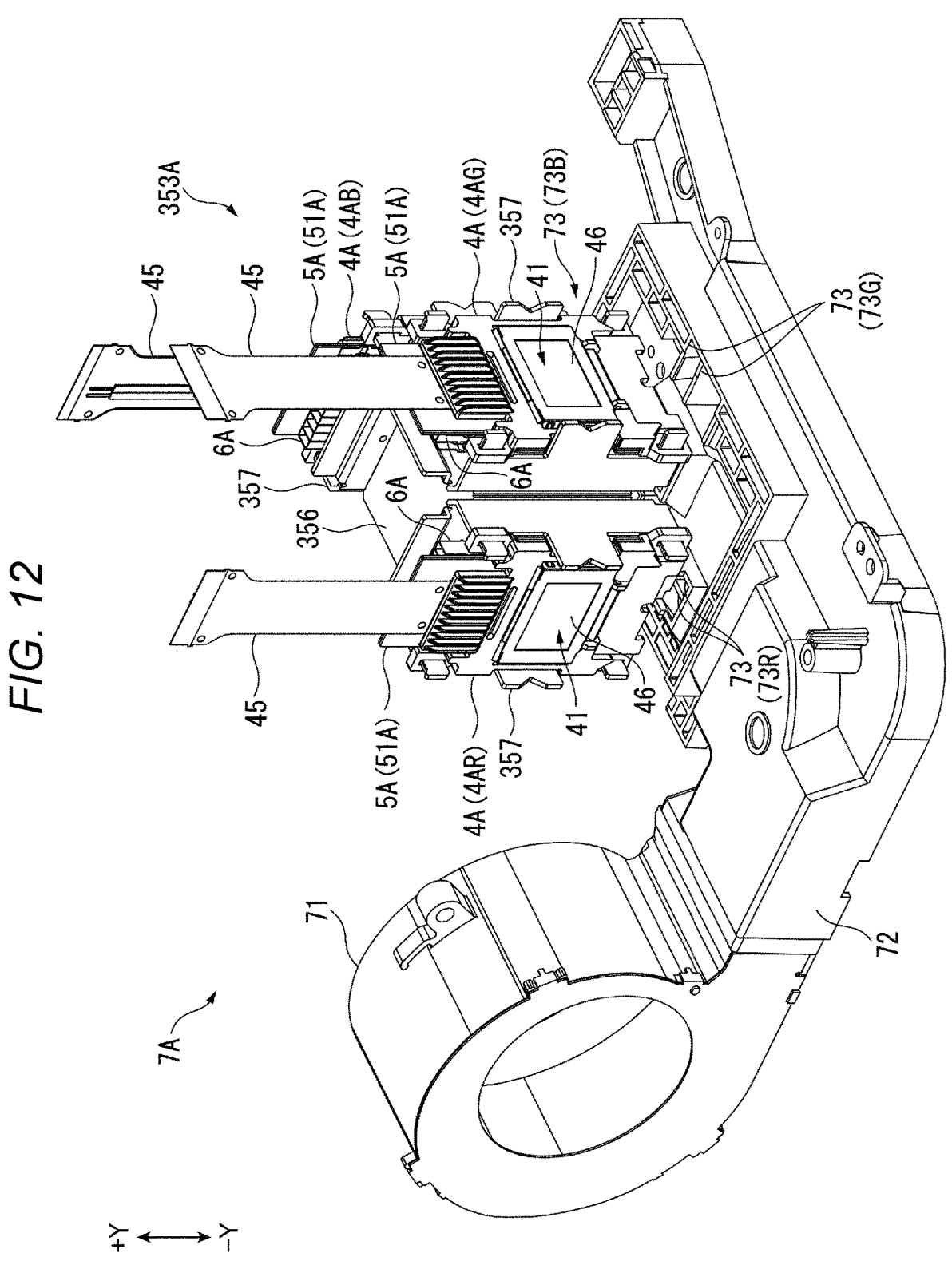
FIG. 12 is a perspective view showing a part of a cooling device according to the first embodiment.

FIG. 12 is a perspective view showing a part of the cooling device 7A.

As explained above, the cooling device 7A is disposed on the inside of the exterior housing 2 and circulates the cooling gas introduced into the inside of the exterior housing 2 from the outside of the exterior housing 2 to the cooling targets and cools the cooling targets. In this embodiment, the cooling device 7A sets the light modulation device 4A as one of the cooling targets and circulates the cooling gas to the cooling member 5A to cool the light modulation device 4A.

The cooling device 7A includes, as shown in FIG. 12, the cooling fan 71 and a duct 72.

The cooling fan 71 circulates the cooling gas introduced into the exterior housing 2 to the light modulation device 4A. Specifically, the cooling fan 71 sucks the cooling gas and feeds the cooling gas into the duct 72 to thereby circulate the cooling gas to the light modulation device 4A via the duct 72. In this embodiment, the cooling fan 71 is configured by a centrifugal fan. However, the cooling fan 71 may be configured by an axial fan.

The duct 72 is connected to the cooling fan 71 and circulates the cooling gas fed from the cooling fan 71 to the light modulation device 4A. In this embodiment, the duct 72 divides the cooling gas fed from the cooling fan 71 and circulates the divided cooling gases respectively to the light modulation devices 4AR, 4AG, and 4AB. The duct 72 of the cooling device 7A includes three first circulating parts 73 that respectively circulate the cooling gases to the three light modulation devices 4A.

The three first circulating parts 73 are provided in the duct 72 and opened in positions in the −Y direction with respect to the light modulation devices 4A corresponding thereto. The first circulating parts 73 circulate the cooling gas fed by the cooling fan 71 in the +Y direction with respect to the light modulation devices 4A corresponding thereto. The +Y direction is a direction from the pixel arrangement region AR toward the first heat radiating member 6A and is equivalent to the first direction. The three first circulating parts 73 include a first circulating part 73R that circulates the cooling gas to the light modulation device 4AR, a first circulating part 73G that circulates the cooling gas to the light modulation device 4AG, and a first circulating part 73B that circulates the cooling gas to the light modulation device 4AB.

Flow of the Cooling Gas Circulating to the Light Modulation Device

Figure 13:
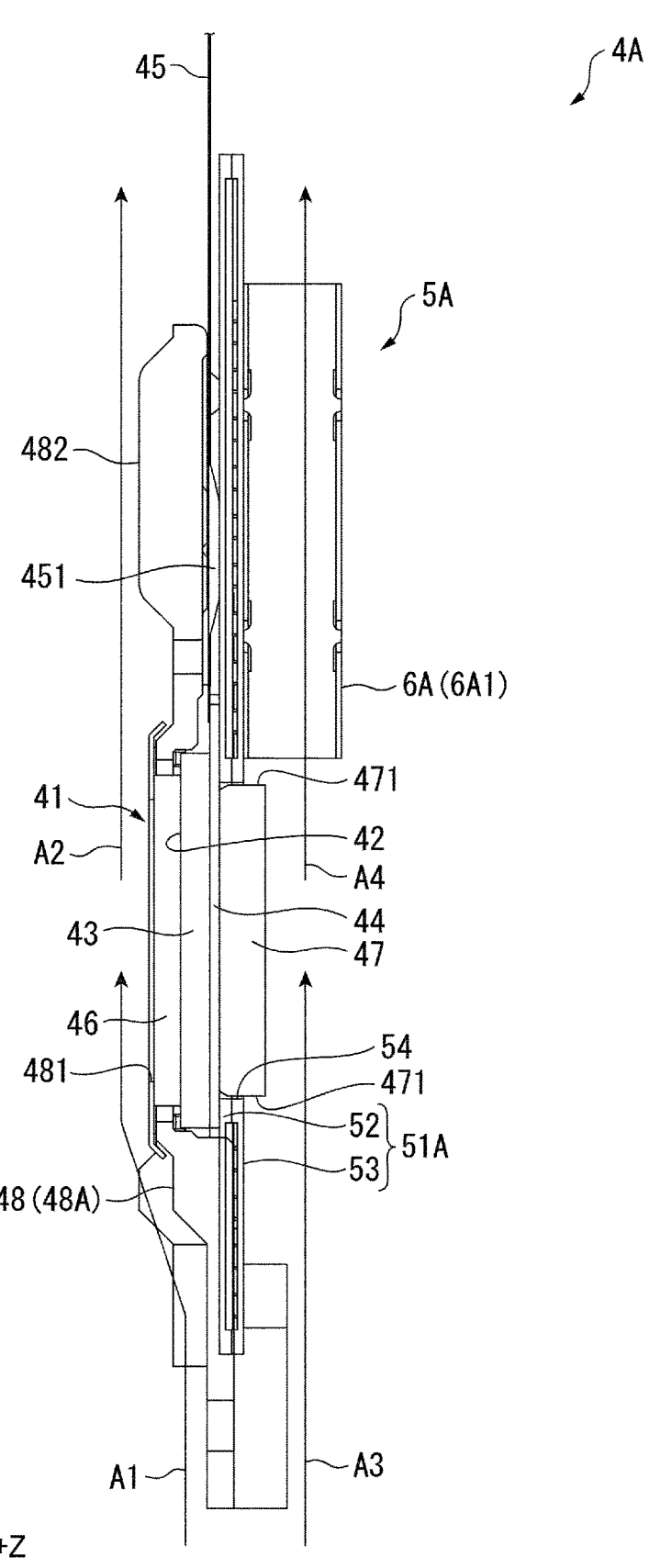
FIG. 13 is a schematic diagram showing a flow of a cooling gas circulating in the light modulation device according to the first embodiment.

FIG. 13 is a schematic diagram showing a flow of the cooling gas circulating in the light modulation device 4A.

As shown in FIG. 13, the cooling gas fed from the first circulating parts 73 is divided into, at the end portion in the −Y direction in the light modulation device 4A, a cooling gas A1 circulating in a space in the −Z direction with respect to the light modulation device 4A and a cooling gas A3 circulating in a space in the +Z direction with respect to the light modulation device 4A. That is, the cooling gas A1 circulates along a surface 48A in the −Z direction in the holding housing 48 and the cooling gas A3 circulates along the surface in the +Z direction on the heat radiating substrate 53 of the cooling member 5A.

In a process of circulating in the +Y direction, the cooling gas A1 circulating along the surface 48A of the holding housing 48 cools the first dustproof member 46 provided to correspond to the pixel arrangement region AR and the holding housing 48. That is, in the heat generated by the liquid crystal layer 42, heat transmitted to the first dustproof member 46 and the holding housing 48 via the first substrate 43 is transmitted to the cooling gas A1. Consequently, a part of the heat generated by the liquid crystal layer 42 is radiated.

A cooling gas A2 having cooled the first dustproof member 46 further circulates in the +Y direction along the surface 48A of the holding housing 48 and cools the heat radiating fins 482 of the holding housing 48. Consequently, the heat of the liquid crystal layer 42 transmitted to the holding housing 48 is further cooled.

The cooling gas A3 circulates in the +Y direction to circulate to the second dustproof member 47 and cools the second dustproof member 47 provided to correspond to the pixel arrangement region AR. Since the heat of the liquid crystal layer 42 is transmitted to the second dustproof member 47 via the second substrate 44, the cooling gas A3 circulates to the second dustproof member 47, whereby a part of the heat of the liquid crystal layer 42 is radiated.

A cooling gas A4 having cooled the second dustproof member 47 circulates in the +Y direction along the heat radiating substrate 53 and circulates in the channels formed in the fins 6A1 of the first heat radiating member 6A. The fins 6A1 transmit the heat received from the working fluid in the gas phase by the first condensing part 57 to the cooling gas A4. The heat transmitted to the working fluid by the heat receiving substrate 52 derives from the heat of the liquid crystal layer 42. Therefore, the heat transmitted to the fins 6A1 is transmitted to the cooling gas A4, whereby a part of the heat of the liquid crystal layer 42 is radiated.

In the light modulation device 4A, the first condensing part 57 that condenses the working fluid in the gas phase into the working fluid in the liquid phase is provided further in the +Y direction than a connecting portion to the second substrate 44 and a connecting portion to the second dustproof member 47 on the heat receiving substrate 52. In other words, the first condensing part 57 is provided in the +Y direction with respect to the opening 54.

Therefore, when the +Y direction is a direction indicating the vertical direction upper side in the light modulation device 4A, it is possible to make it easy to transport the working fluid in the liquid phase condensed by the first condensing part 57 to the connecting portion to the second substrate 44 and the connecting portion to the second dustproof member 47 on the heat receiving substrate 52 not only with a capillary force generated by the mesh structure MS but also with the gravity. Consequently, it is possible to promote the phase change of the working fluid from the liquid phase to the gas phase on the heat receiving substrate 52 with the heat transmitted from the liquid crystal layer 42 via the second substrate 44 and the second dustproof member 47. That is, it is possible to improve heat radiation efficiency of the heat of the liquid crystal layer 42 and cooling efficiency of the liquid crystal layer 42.

Effects of the First Embodiment

The projector 1 according to this embodiment explained above achieves effects described below.

The projector 1 includes the light source 31, the light modulation device 4A that modulates light emitted from the light source 31, and the projection optical device 37 that projects the light modulated by the light modulation device 4A.

The light modulation device 4A includes the pixel arrangement region AR in which the plurality of pixels are arranged. The light modulation device 4A includes the liquid crystal layer 42, the first substrate 43, the second substrate 44, and the cooling member 5A.

The second substrate 44 is disposed to be opposed to the first substrate 43 via the liquid crystal layer 42.

The cooling member 5A is disposed on the opposite side of the first substrate 43 with respect to the second substrate 44 and thermally connected to the second substrate 44. The cooling member 5A includes the hollow space SP in which the working fluid is encapsulated and changes the working fluid in the liquid phase to the working fluid in the gas phase to thereby cool the liquid crystal layer 42.

With such a configuration, since the heat of the liquid crystal layer 42 is transmitted to the second substrate 44, the heat of the liquid crystal layer 42 is transmitted to the cooling member 5A via the second substrate 44. The cooling member 5A changes the working fluid in the liquid phase encapsulated in the hollow space SP to the working fluid in the gas phase with the transmitted heat and consumes the heat of the liquid crystal layer 42 to thereby cool the liquid crystal layer 42. Consequently, since the heat of the liquid crystal layer 42 transmitted to the cooling member 5A can be efficiently consumed, it is possible to efficiently cool the liquid crystal layer 42. Therefore, even if the pixel arrangement region AR of the light modulation device 4A is small, it is possible to improve the cooling efficiency of the liquid crystal layer 42. Consequently, it is possible to increase an amount of light made incident on the light modulation device 4A and achieve extension of the life of the light modulation device 4A.

Since it is possible to improve the cooling efficiency of the light modulation device 4A, it is possible to reduce a flow rate of the cooling gas circulated to the light modulation device 4A by the cooling fan 71 of the cooling device 7A. Accordingly, since a flow rate of the cooling gas sufficient for the cooling of the light modulation device 4A can be secured even when a small fan is adopted as the cooling fan 71, it is possible to achieve a reduction in the size of the projector 1. On the other hand, since the number of revolutions per unit time of the cooling fan 71 can be reduced when a large fan is adopted as the cooling fan 71, it is possible to reduce noise of the projector 1.

Further, since it is possible to improve the cooling efficiency of the light modulation device 4A, the light modulation device 4A can be reduced in size. Therefore, the projection optical device 37 small in size can be adopted in the projector 1 and the projector 1 can be reduced in size.

In the light modulation device 4A, the cooling member 5A includes the heat receiving substrate 52 and the heat radiating substrate 53. The heat receiving substrate 52 is connected to the second substrate 44 and changes the working fluid in the liquid phase to the working fluid in the gas phase with the heat transmitted from the second substrate 44. The heat radiating substrate 53 is joined to the heat receiving substrate 52 on the opposite side of the second substrate 44 with respect to the heat receiving substrate 52 and forms the hollow space SP in conjunction with the heat receiving substrate 52. The heat radiating substrate 53 radiates the heat of the working fluid in the gas phase and condenses the working fluid in the gas phase into the working fluid in the liquid phase.

With such a configuration, the cooling member 5A can be configured as a vapor chamber. Since the heat receiving substrate 52 is connected to the second substrate 44, it is possible to efficiently change the working fluid in the liquid phase to the working fluid in the gas phase with the transmitted heat. Since the heat radiating substrate 53 is disposed on the opposite side of the second substrate 44 with respect to the heat receiving substrate 52, it is possible to efficiently radiate the heat of the working fluid in the gas phase and efficiently condense the working fluid in the gas phase into the working fluid in the liquid phase. Therefore, it is possible to efficiently radiate the heat of the liquid crystal layer 42 transmitted to the cooling member 5A and improve the cooling efficiency of the liquid crystal layer 42.

The light modulation device 4A includes the second dustproof member 47 provided in the portion of the second substrate 44 corresponding to the pixel arrangement region AR. The second dustproof member 47 is equivalent to the light transmissive substrate according to the present disclosure. The cooling member 5A includes the opening 54 in which the second dustproof member 47 is fit. The inner edge of the opening 54 is thermally connected to the end faces 471 of the second dustproof member 47.

With such a configuration, the light modulation device 4A can be configured as a transmissive light modulation device in which light can be transmitted through the pixel arrangement region AR. The inner surface of the opening 54 through which light can pass in the cooling member 5A and the end faces 471 of the second dustproof member 47 provided on the second substrate 44 to correspond to the pixel arrangement region AR are thermally connected. Consequently, the heat of the liquid crystal layer 42 transmitted to the second substrate 44 is not only directly transmitted to the cooling member 5A from the second substrate 44 but also transmitted from the second substrate 44 via the second dustproof member 47. Accordingly, since it is possible to increase transmission routes for the heat of the liquid crystal layer 42 to the cooling member 5A, even when the cooling member 5A includes the opening 54, it is possible to efficiently transmit the heat of the liquid crystal layer 42 to the cooling member 5A. Therefore, it is possible to improve the cooling efficiency of the liquid crystal layer 42.

In the light modulation device 4A, the heat receiving substrate 52 includes the mesh structure MS that is provided in the hollow space SP and into which the working fluid in the liquid phase soaks. The heat radiating substrate 53 includes the plurality of columnar bodies PL that are provided in the hollow space SP and form the channels in which the working fluid in the gas phase circulates.

With such a configuration, since the working fluid in the liquid phase can be easily held by the heat receiving substrate 52, it is possible to make it easy to change the working fluid in the liquid phase to the working fluid in the gas phase with the heat transmitted to the heat receiving substrate 52. Since the heat radiating substrate 53 includes the plurality of columnar bodies PL, it is possible to increase the strength of the cooling member 5A and it is possible to make it easy to circulate the working fluid in the gas phase to the part where the working fluid is changed from the gas phase to the liquid phase. Therefore, it is possible to promote the phase change of the working fluid in the cooling member and improve the cooling efficiency of the liquid crystal layer 42.

The light modulation device 4A includes the printed board 45 extending from the first substrate 43 and the second substrate 44 and the driver circuit 451 provided on the printed board 45. The driver circuit 451 is equivalent to the circuit element according to the present disclosure. The driver circuit 451 is thermally connected to the heat receiving substrate 52.

With such a configuration, since the heat generated by the driver circuit 451 can be transmitted to the heat receiving substrate 52, the driver circuit 451 can be cooled by the cooling member 5A. Therefore, since it is unnecessary to separately provide a component that cools the driver circuit 451, it is possible to suppress the configuration of the light modulation device 4A from being complicated.

In the light modulation device 4A, the cooling member includes the first condensing part 57 and the first heat radiating member 6A. The first condensing part 57 is provided on the heat radiating substrate 53 and condenses the working fluid in the gas phase circulating in the hollow space SP into the working fluid in the liquid phase. The first heat radiating member 6A is provided on the outer surface of the heat radiating substrate 53 corresponding to the first condensing part 57. The first heat radiating member 6A radiates the heat transmitted from the working fluid in the gas phase.

With such a configuration, the first heat radiating member 6A radiates the heat transmitted from the working fluid in the gas phase. Consequently, it is possible to promote the condensation from the working fluid in the gas phase into the working fluid in the liquid phase in the first condensing part 57 and promote the change of the working fluid in the liquid phase to the working fluid in the gas phase by the transmitted heat of the liquid crystal layer 42. Therefore, since it is possible to improve the heat radiation efficiency of the heat of the liquid crystal layer 42, it is possible to improve the cooling efficiency of the liquid crystal layer 42.

The light modulation device 4A includes the holding housing 48 that is combined with the cooling member 5A and holds the liquid crystal layer 42, the first substrate 43, and the second substrate 44 on the inside. The holding housing 48 includes the position adjusting parts 483 for adjusting the position of the holding housing 48.

With such a configuration, the heat transmitted from the liquid crystal layer 42 can be radiated by the holding housing 48. Consequently, it is possible to expand a heat radiation area for the heat of the liquid crystal layer 42.

Since the holding housing 48 includes the position adjusting part 483, it is unnecessary to provide the same position adjusting part in the cooling member 5A combined with the holding housing 48. Consequently, since a load can be suppressed from being applied to the cooling member 5A, it is possible to cause the cooling member 5A to stably function.

The projector 1 includes, besides the light source 31, the light modulation device 4A, and the projection optical device 37, the cooling device 7A that circulates the cooling gas to the cooling member 5A. The cooling device 7A includes the first circulating parts 73 that circulates the cooling gas in the +Y direction from the pixel arrangement region AR toward the first heat radiating member 6A. The +Y direction is equivalent to the first direction.

With such a configuration, the second dustproof member 47 and the first heat radiating member 6A are cooled by the cooling gas circulated in the +Y direction by the cooling device 7A. That is, the pixel arrangement region AR in which the second dustproof member 47 is disposed and the first heat radiating member 6A can be cooled by the cooling gas circulating in the +Y direction. At this time, since the pixel arrangement region AR is disposed upstream in a channel of the cooling gas with respect to the first heat radiating member 6A, compared with when the pixel arrangement region AR is disposed downstream with respect to the first heat radiating member 6A, the cooling gas having low temperature can be circulated to the second dustproof member 47 disposed to correspond to the pixel arrangement region AR. Therefore, it is possible to improve cooling efficiency of the pixel arrangement region AR and improve the cooling efficiency of the liquid crystal layer 42.

Second Embodiment

A second embodiment of the present disclosure is explained.

A projector according to this embodiment has the same configuration as the configuration of the projector 1 according to the first embodiment. On the other hand, the projector according to this embodiment is different from the projector 1 according to the first embodiment in that the configuration of a duct included in a cooling device and the configuration of heat radiating fins provided in a cooling member are different. In the following explanation, the same portions as the portions explained above are denoted by the same reference numerals and signs and explanation of the portions is omitted.

Schematic Configuration of the Projector

Figure 14:
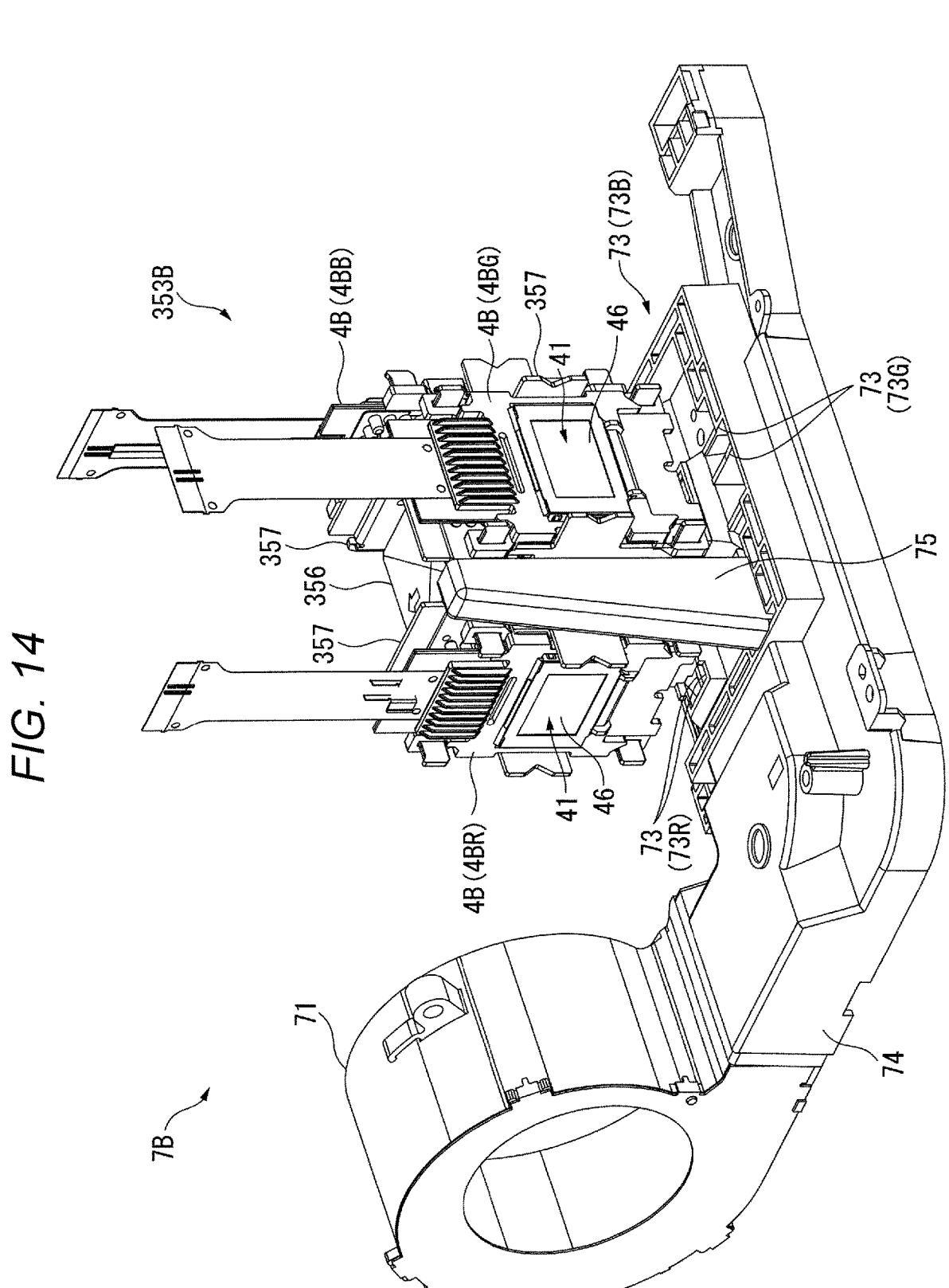
FIG. 14 is a perspective view showing a duct of a cooling device included in a projector according to a second embodiment.

FIG. 14 is a perspective view showing a duct 74 of a cooling device 7B included in the projector according to this embodiment.

The projector according to this embodiment includes the same components and the same functions as the components and the functions of the projector 1 according to the first embodiment except that the projector includes an image forming unit 353B and the cooling device 7B shown in FIG.

14 instead of the image forming unit 353A and the cooling device 7A according to the first embodiment. The image forming unit 353B includes the same components and the same functions as the components and the functions of the image forming unit 353A except that the image forming unit 353B includes three light modulation devices 4B instead of the three light modulation devices 4A.

Like the light modulation devices 4A according to the first embodiment, the light modulation devices 4B modulate, according to image information, light emitted from the light source 31 and are configured by transmissive liquid crystal panels. The light modulation devices 4B include a light modulation device 4BR that modulates red light, a light modulation device 4BG that modulates green light, and a light modulation device 4BB that modulates blue light.

The configuration of the light modulation devices 4B is explained in detail below.

Configuration of the Cooling Device

Like the cooling device 7A according to the first embodiment, the cooling device 7B circulates a cooling gas introduced into the inside of the exterior housing 2 to cooling targets and cools the cooling targets. Specifically, the cooling device 7B cools the light modulation device 4B. The cooling device 7B includes the same components and the same functions as the components and the functions of the cooling device 7A according to the first embodiment except that the cooling device 7B includes the duct 74 instead of the duct 72 according to the first embodiment. That is, the cooling device 7B includes, as shown in FIG. 14, the cooling fan 71 and the duct 74.

Figure 15:
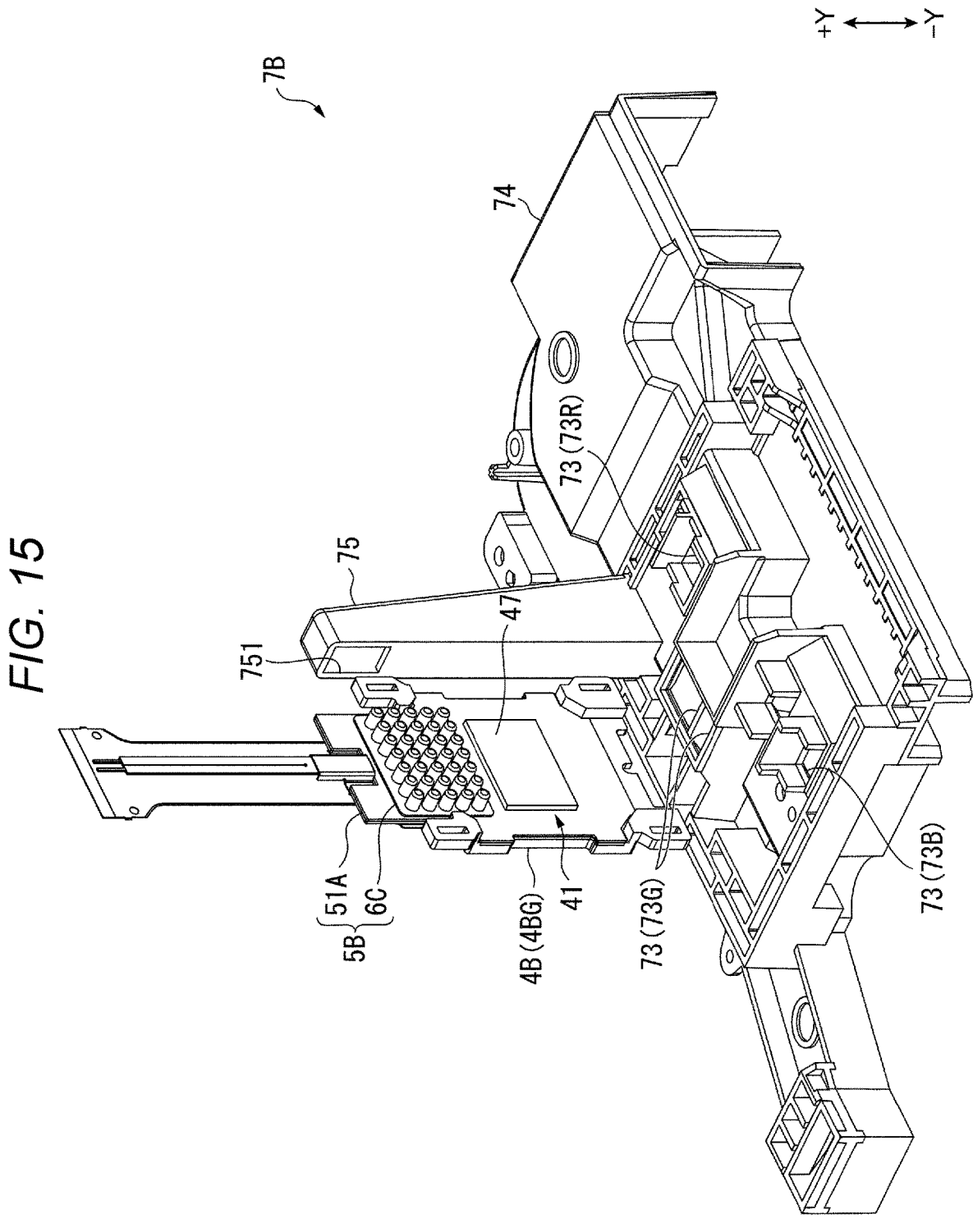
FIG. 15 is a perspective view showing the duct and a light modulation device according to the second embodiment.

FIG. 15 is a perspective view of the duct 74 and the light modulation device 4BG viewed from a light incident side in the light modulation device 4BG.

Like the duct 72 according to the first embodiment, the duct 74 divides the cooling gas fed from the cooling fan 71 and circulates the divided cooling gases to the three light modulation devices 4B. As shown in FIGS. 14 and 15, the duct 74 of the cooling device 7B includes three first circulating parts 73 and further includes a second circulating part 75.

The three first circulating parts 73 include the first circulating part 73R that circulates the cooling gas to the light modulation device 4BR, the first circulating part 73G that circulates the cooling gas to the light modulation device 4BG, and the first circulating part 73B that circulates the cooling gas to the light modulation device 4BB.

The second circulating part 75 stands in the +Y direction from a position near the first circulating parts 73G and 73R. The second circulating part 75 circulates a part of the cooling gas divided in the duct 74 to a first heat radiating member 6C of a cooling member 5B included in the light modulation device 4BG.

As shown in FIG. 15, the second circulating part 75 includes a feeding port 751 at the end portion in the +Y direction. The feeding port 751 feeds, in a direction orthogonal to the +Y direction, which is a standing direction of the second circulating part 75, the cooling gas having circulated in the second circulating part 75. That is, the feeding port 751 feeds the cooling gas along a direction orthogonal to a circulating direction of the cooling gas circulating in the +Y direction from the first circulating parts 73. That is, the second circulating part 75 circulates the cooling gas to the first heat radiating member 6C along the +X direction crossing the +Y direction, which is the first direction. Specifically, the feeding port 751 feeds the cooling gas to the first heat radiating member 6C along the +X direction for the light modulation device 4BG.

Configuration of the Light Modulation Device

Figure 16:
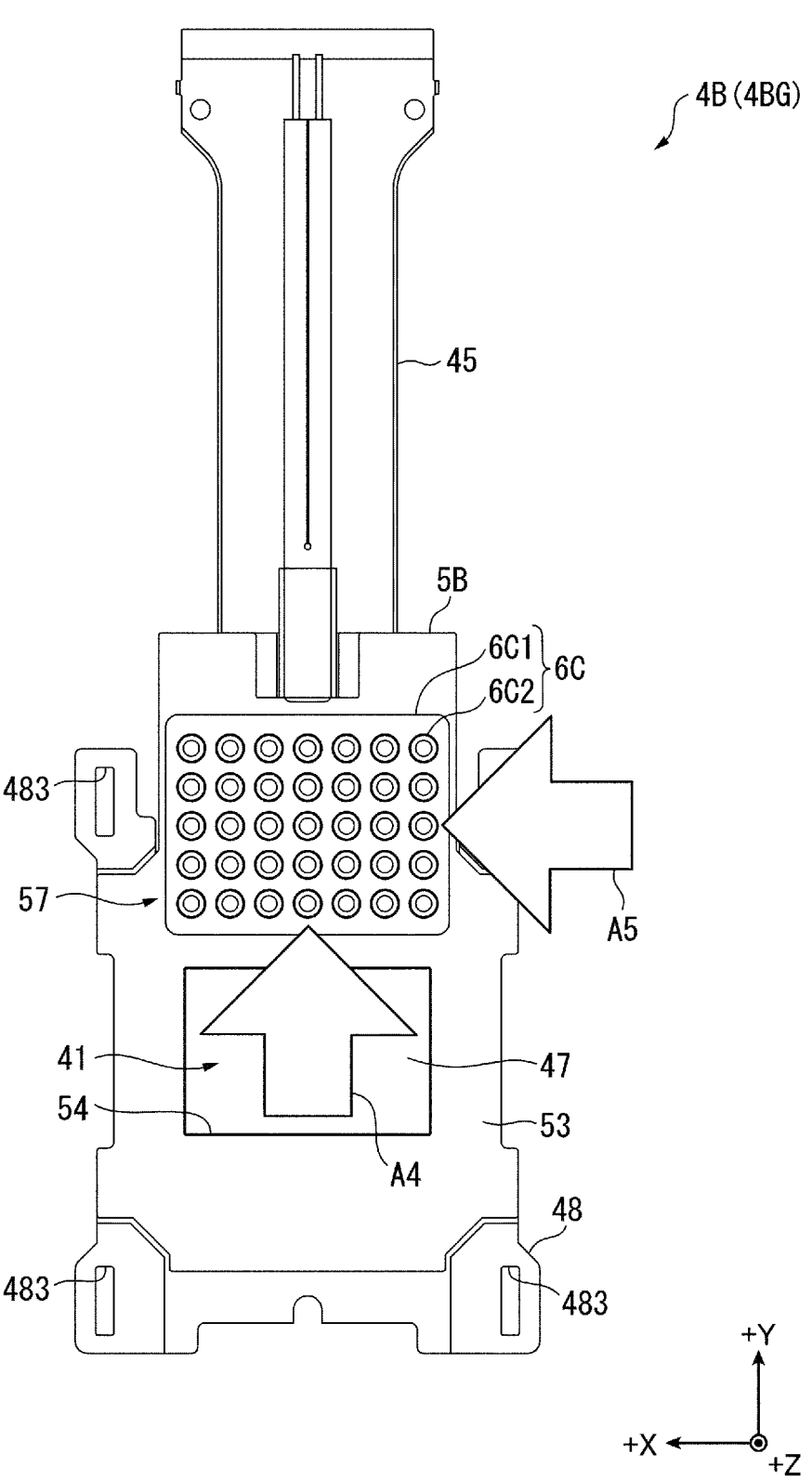
FIG. 16 is a diagram showing the light modulation device according to the second embodiment.

FIG. 16 is a diagram of the light modulation device 4BG viewed from the +Z direction. In other words, FIG. 16 is a diagram showing a flow of the cooling gas circulating to the first heat radiating member 6C of the light modulation device 4BG. In FIG. 16, a part of a plurality of fins 6C2 are denoted by the reference sign.

As shown in FIG. 16, the light modulation device 4B includes the same components and the same functions as the components and the functions of the light modulation device 4A according to the first embodiment except that the light modulation device 4B includes the cooling member 5B instead of the cooling member 5A according to the first embodiment. The cooling member 5B includes the same components and the same functions as the components and the functions of the cooling member 5A according to the first embodiment except that the cooling member 5B includes the first heat radiating member 6C instead of the first heat radiating members 6A and 6B according to the first embodiment.

Like the first heat radiating members 6A and 6B, the first heat radiating member 6C is provided on the heat radiating substrate 53 to correspond to the first condensing part 57 and transmits, to the cooling gas, the heat of the working fluid in the gas phase transmitted from the first condensing part 57.

The first heat radiating member 6C includes a heat receiving plate 6C1 and the plurality of fins 6C2.

The heat receiving plate 6C1 is provided in a portion of the heat radiating substrate 53 corresponding to the first condensing part 57 on the surface of the heat radiating substrate 53 in the +Z direction and thermally connected to the first condensing part 57.

Each of the plurality of fins 6C2 projects from the heat receiving plate 6C1 in a cylindrical shape in the +Z direction. The plurality of fins 6C2 are provided at equal intervals along each of the +X direction and the +Y direction. Among the plurality of fins 6C2, first channels in which the cooling gas can circulate along the +Y direction are provided and second channels in which the cooling gas can circulate along the +X direction are provided. That is, the first heat radiating member 6C includes the plurality of fins 6C2 in which the cooling gas can circulate along each of the +Y direction and the +X direction.

Flow of the Cooling Gas Circulating to the Light Modulation Device

Like the light modulation device 4A according to the first embodiment, a part of the cooling gas circulating in the +Y direction from the first circulating parts 73 circulates in a space in the −Z direction with respect to the light modulation device 4B and cools the first dustproof member 46 and the holding housing 48. Consequently, a part of the heat of the liquid crystal layer 42 is cooled.

The other cooling gas circulating in the +Y direction from the first circulating parts 73 circulates in a space in the +Z direction with respect to the light modulation device 4B, circulates along the heat radiating substrate 53 and the second dustproof member 47, and cools the heat radiating substrate 53 and the second dustproof member 47.

The cooling gas A4 having cooled the second dustproof member 47 circulates along the +Y direction in the first heat radiating member 6C disposed in the +Y direction with respect to the second dustproof member 47. That is, the cooling gas A4 circulates in the +Y direction among the plurality of fins 6C2.

Further, a cooling gas A5 circulating in the +X direction from the feeding port 751 (see FIG. 15) of the second circulating part 75 circulates along the +X direction in the first heat radiating member 6C. That is, the cooling gas A5 circulates in the +X direction among the plurality of fins 6C2.

Accordingly, the cooling gas A4 circulating in the +Y direction and the cooling gas A5 circulating in the +X direction collide in the first heat radiating member 6C, whereby a turbulent flow is generated. Such a turbulent flow efficiently comes into contact with the plurality of fins 6C2. Consequently, the heat transmitted to the first heat radiating member 6C can be efficiently transmitted to the cooling gas by the fins 6C2. Therefore, it is possible to efficiently radiate a part of the heat generated in the liquid crystal layer 42.

Another Configuration of the Heat Radiating Fins

Figure 17:
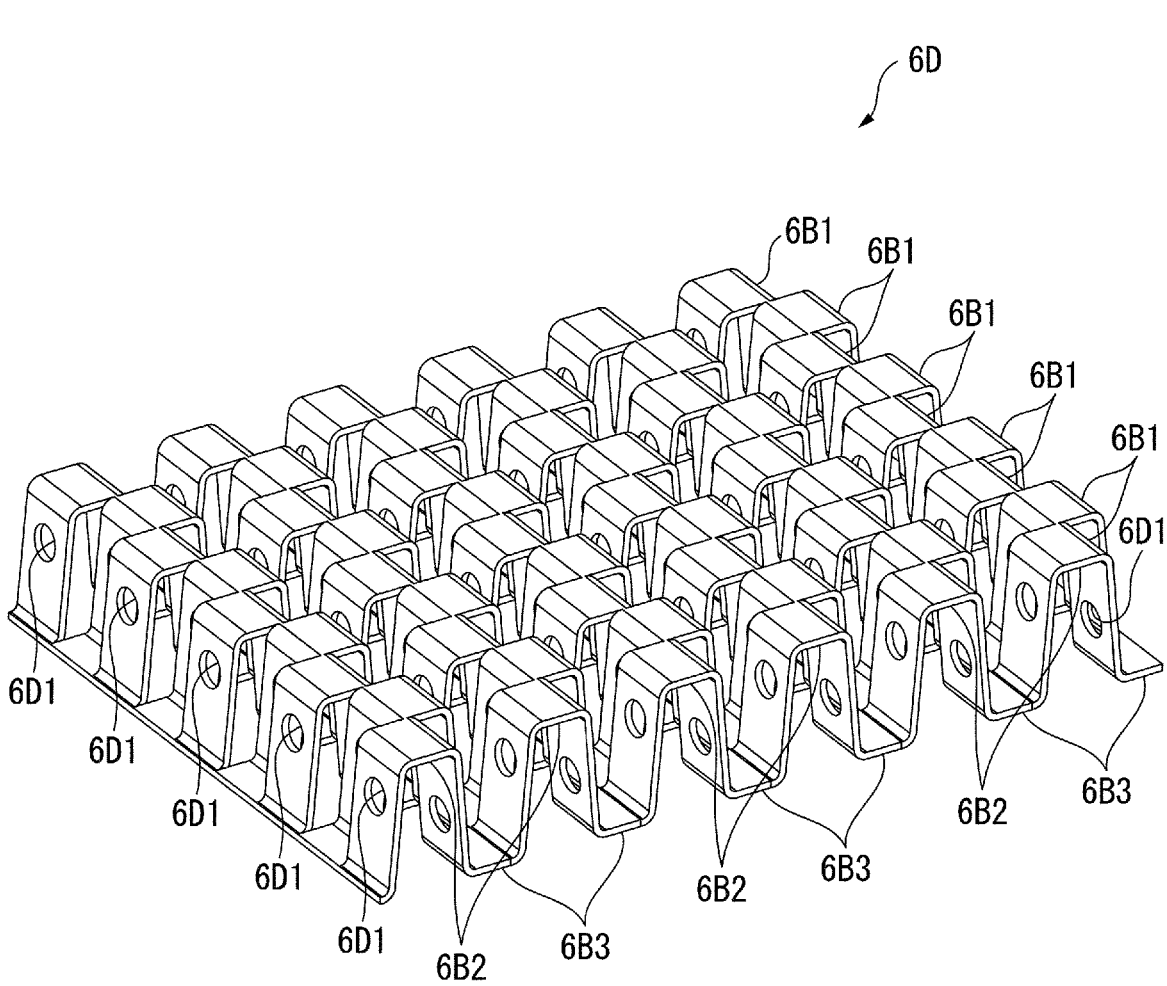
FIG. 17 is a perspective view showing a modification of a first heat radiating member according to the second embodiment.
Figure 17:
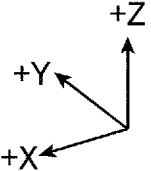

FIG. 17 is a perspective view showing a first heat radiating member 6D, which is a modification of the first heat radiating member 6C. In other words, FIG. 17 is a perspective view showing the first heat radiating member 6D, which is a modification of the first heat radiating member 6B according to the first embodiment. In FIG. 17, a part of the projecting parts 6B2, a part of the flat parts 6B3, and a part of through-holes 6D1 are denoted by the reference signs.

Heat radiating fins in which a cooling gas circulates among a plurality of fins in two directions orthogonal to each other are not limited to the first heat radiating member 6C. The first heat radiating member 6D shown in FIG. 17 may be adopted instead of, for example, the first heat radiating member 6C.

Like the first heat radiating member 6B according to the first embodiment, the first heat radiating member 6D has the configuration in which the plurality of fins 6B1 extending along the +X direction are arrayed in the +Y direction. On the other hand, in the first heat radiating member 6D, unlike the first heat radiating member 6B according to the first embodiment, a plurality of through-holes 6D1 piercing through the projecting parts 6B2 of the fins 6B1 in the +X direction are provided. Accordingly, the first heat radiating member 6D includes first channels in which the cooling gas circulates along the +Y direction in the projecting parts 6B2 and the flat parts 6B3 of the fins 6B1 and second channels in which the cooling gas circulates along the +X direction in the through-holes 6D1.

In such a first heat radiating member 6D as well, the cooling gas A4 can circulate in the +Y direction and the cooling gas A5 can circulate in the +X direction. Accordingly, the cooling gas A4 and the cooling gas A5 collide in the first heat radiating member 6D, whereby a turbulent flow is generated. Consequently, the heat transmitted to the first heat radiating member 6D can be efficiently transmitted to the cooling gas by the fins 6B1. Therefore, a part of the heat generated by the liquid crystal layer 42 can be efficiently radiated.

The through-hole 6D1 in the +X direction of the two through-holes 6D1 formed in the projecting part 6B2 is provided further in the +Z direction than the through-hole 6D1 in the −X direction. Accordingly, the cooling gas A5 circulating through the through-hole 6D1 in the −X direction in the projecting part 6B2 tends to hit the wall in the +X direction in the projecting part 6B2. The cooling gas A5 circulating in the through-hole 6D1 in the +X direction in the projecting part 6B2 tends to hit the wall in the −X direction in the projecting part 6B2 adjacent in the +X direction. Consequently, it is possible to improve heat transmission efficiency of the heat to the cooling gas A5 in the projecting part 6B2, that is, heat radiation efficiency in the projecting part 6B2.

Effects of the Second Embodiment

The projector according to this embodiment explained above achieves effects described below besides achieving the same effects as the effects of the projector 1 according to the first embodiment.

In the projector according to the second embodiment, the cooling device 7B includes the second circulating part 75 that circulates the cooling gas along the +X direction crossing the +Y direction. The +Y direction is equivalent to the first direction and the +X direction is equivalent to the second direction.

With such a configuration, it is possible to cause the cooling gas circulating in the +Y direction and the cooling gas circulating in the +X direction to collide in the first heat radiating member 6C. Consequently, since a turbulent flow of the cooling gas can be generated in the first heat radiating member 6C, it is possible to make it easy to cool the first heat radiating member 6C. Therefore, it is possible to improve the heat radiation efficiency of the heat of the liquid crystal layer 42 and improve the cooling efficiency of the liquid crystal layer 42. The same applies when the first heat radiating member 6D is adopted instead of the first heat radiating member 6C.

In the projector according to the second embodiment, the first heat radiating member 6C includes the plurality of fins 6C2 in which the cooling gas can circulate along each of the +Y direction and the +X direction. The first heat radiating member 6D includes the plurality of fins 6B1 in which the cooling gas can circulate along each of the +Y direction and the +X direction.

With such a configuration, a turbulent flow of the cooling gas can be generated between the plurality of fins 6C2 and 6B1. Therefore, it is possible to improve the heat radiation efficiency of the heat by the first heat radiating members 6C and 6D and improve the cooling efficiency of the liquid crystal layer 42.

Third Embodiment

A third embodiment of the present disclosure is explained.

The projector according to this embodiment includes the same components as the components of the projector 1 according to the first embodiment. However, the configuration of a cooling member is different. In the following explanation, the same or substantially the same portions as the portions explained above are denoted by the same reference numerals and signs and explanation of the portions is omitted.

Schematic Configuration of the Projector

Figure 18:
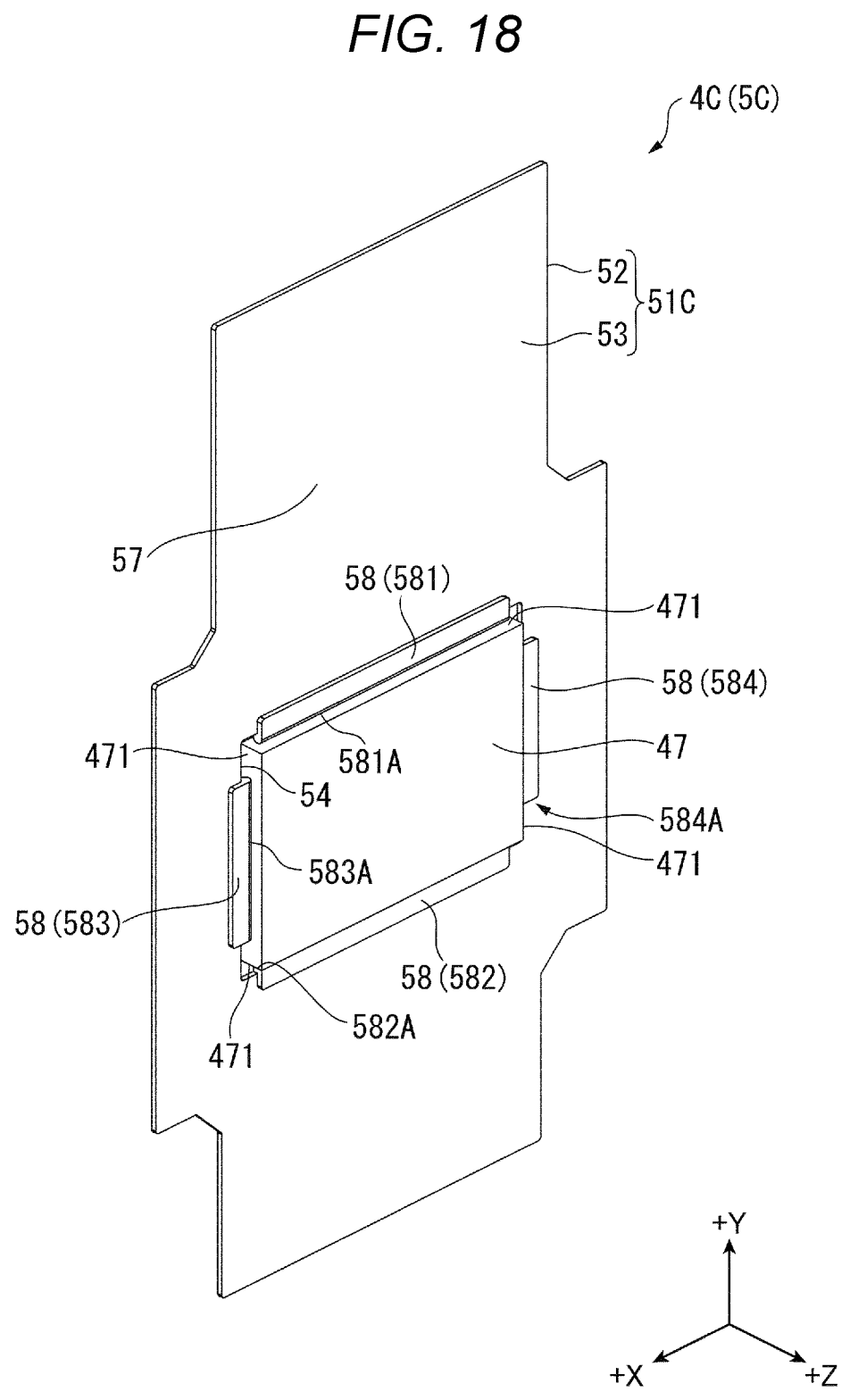

FIG. 18 is a perspective view showing a cooling member 5C and the second dustproof member 47 of a light modulation device 4C included in the projector according to this embodiment.

The projector according to this embodiment includes the same components and the same functions as the components and the functions of the projector 1 according to the first embodiment except that the projector includes the light modulation device 4C instead of the light modulation device 4A according to the first embodiment. The light modulation device 4C includes the same components and the same functions as the components and the functions of the light modulation device 4A according to the first embodiment except that the light modulation device 4C includes the cooling member 5C shown in FIG. 18 instead of the cooling member aA according to the first embodiment.

Configuration of the Cooling Member

Like the cooling member 5A, the cooling member 5C includes the hollow space SP in which the working fluid is encapsulated and changes the working fluid in the liquid phase to the working fluid in the gas phase with the heat transmitted from the liquid crystal layer 42 of the panel main body 41 to thereby cool the liquid crystal layer 42. The cooling member includes a main body 51C and a not-shown heat radiating fin. As the heat radiating fin included in the cooling member 5C, for example, the first heat radiating members 6A and 6B according to the first embodiment or the first heat radiating members 6C and 6D according to the second embodiment can be adopted.

Configuration of the Main Body

The main body 51C includes the same components and the same functions as the components and the functions of the main body 51A according to the first embodiment except that the main body 51C further includes bent parts 58. That is, although not illustrated, the main body 51C includes the encapsulating part 55 and the protecting parts 56 besides including the heat receiving substrate 52, the heat radiating substrate 53, the opening 54, the first condensing part 57, and the bent parts 58.

Four bent parts 58 configure a part of the inner edge of the opening 54. Each of the four bent parts 58 is formed by bending a portion extending to the inner side of the opening 54. That is, the bent part 58 is a portion formed by bending a part of the main body 51C to the opposite side of the second substrate 44 from the second substrate 44 side. The four bent parts 58 includes a bent part 581 disposed in the +Y direction with respect to the opening 54, a bent part 582 disposed in the −Y direction with respect to the opening 54, a bent part 583 disposed in the +X direction with respect to the opening 54, and a bent part 584 disposed in the −X direction with respect to the opening 54.

The bent part 581 is formed by bending, in the +Z direction, a portion extending to the inner side of the opening 54 and further bending the portion in the +Y direction. The bent part 582 is formed by bending, in the +Z direction, a portion extending to the inner side of the opening 54 and further bending the portion in the −Y direction. The bent parts 583 and 584 are formed in the same manner.

A surface 581A of the bent part 581 in the −Y direction, a surface 582A of the bent part 582 in the +Y direction, a surface 583A of the bent part 583 in the −X direction, and a surface 584A of the bent part 584 in the +X direction form parts of the inner edge of the opening 54. Each of the surfaces 581A, 582A, 583A, and 584A is thermally connected to a side surface of the second dustproof member 47, that is, an end face extending along the peripheral direction centering on the optical axis of the second dustproof member 47. The surfaces 581A, 582A, 583A, and 584A are surfaces formed by the heat receiving substrate 52.

In the main body, which is a vapor chamber, the heat receiving substrate and the heat radiating substrate need to be joined to each other because the working fluid is encapsulated in a hollow space provided on the inside of the main body. Accordingly, for example, joining parts are provided at the outer edge of the heat receiving substrate and the outer edge of the heat radiating substrate and in the periphery of the opening. The heat receiving substrate and the heat radiating substrate are joined in the joining parts.

However, in such a configuration, if the dimension of the joining parts in the direction toward the outer side of the opening is large, the distance from the inner edge of the opening to the hollow space tends to be large. Heat transmitted from the end edge of the opening to the main body is less easily transmitted to the working fluid in the liquid phase in the hollow space. That is, in such a configuration, the heat is less easily efficiently transmitted from the inner edge of the opening to the working fluid in the liquid phase.

Figure 19:
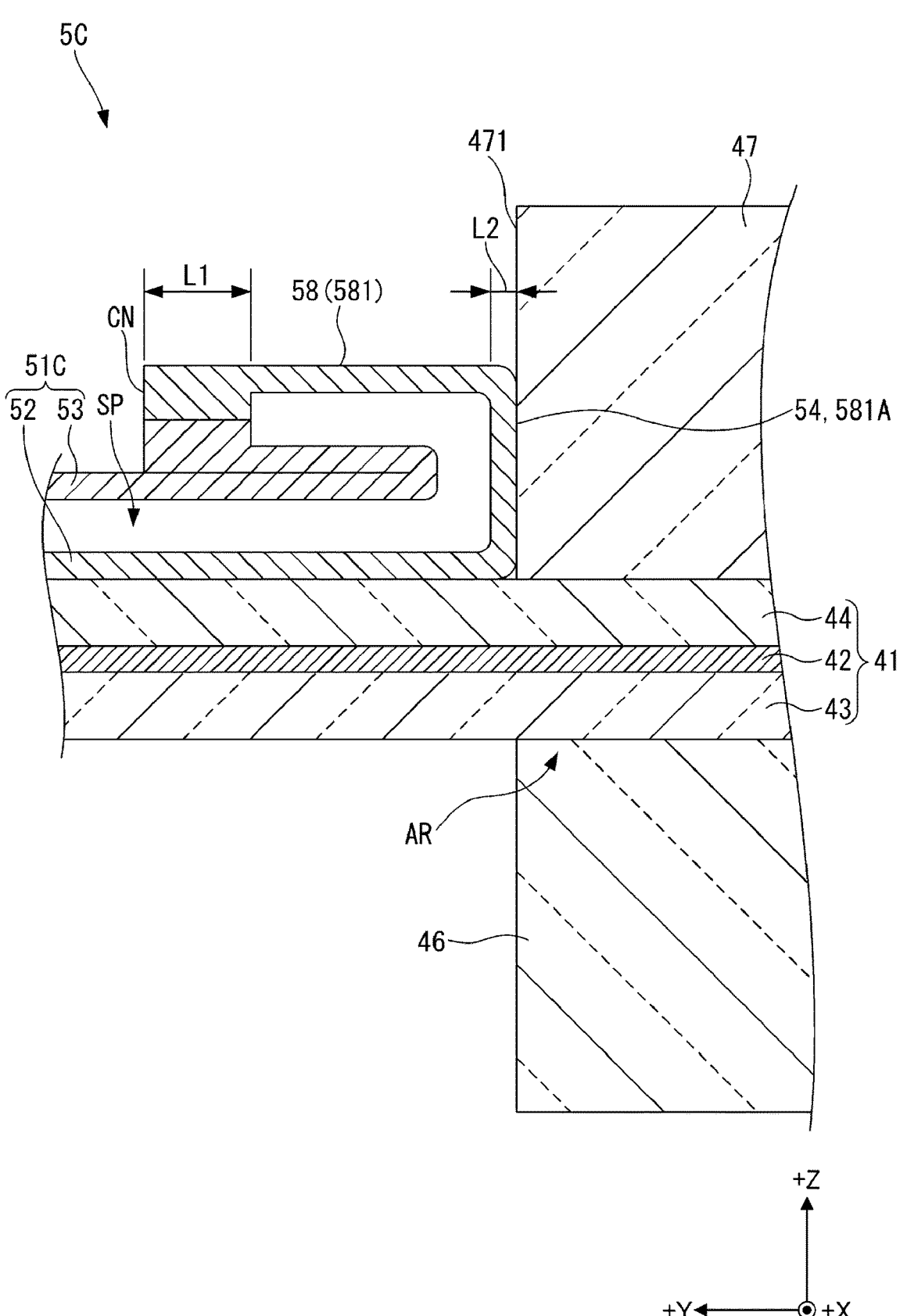
FIG. 19 is a sectional view showing the cooling member and the second dustproof member according to the third embodiment.

FIG. 19 is a diagram showing the cross section of the cooling member 5C and the second dustproof member 47 taken along a YZ plane. In FIG. 19, illustration about the mesh structure MS included in the heat receiving substrate 52 and the columnar bodies PL included in the heat radiating substrate 53 is omitted.

In contrast, the main body 51C includes the bent parts 581 to 584. The end faces 471 of the second dustproof member 47 fit in the opening 54 are thermally connected to the surfaces 581A, 582A, 583A, and 584A configured by the heat receiving substrate 52. A joining portion CN of the heat receiving substrate 52 and the heat radiating substrate 53 in the main body 51C is disposed further on the outer side of the opening 54 than the end faces 471.

Consequently, compared with when the inner edge of the opening is formed by the end faces of the joining parts as explained above, the distance from the inner edge of the opening 54 to the hollow space SP can be reduced as shown in FIG. 19. Accordingly, it is possible to make it easy to transmit the heat transmitted from the second dustproof member 47 to the working fluid in the liquid phase that soaks into the mesh structure MS of the heat receiving substrate 52. Therefore, it is possible to efficiently change the working fluid in the liquid phase to the working fluid in the gas phase with the heat of the liquid crystal layer 42 transmitted from the second dustproof member 47. It is possible to efficiently cool the liquid crystal layer 42.

Effects of the Third Embodiment

The projector according to this embodiment explained above achieves effects described below besides achieving the same effects as the effects of the projector 1 according to the first embodiment.

In the light modulation device 4C of the projector according to the third embodiment, the cooling member 5C includes the bent parts 58 bent to the opposite side of the second substrate 44 from the second substrate 44 side. The bent parts 58 form the inner edge of the opening 54. The heat receiving substrate 52 is thermally connected to the end faces 471 of the second dustproof member 47. The second dustproof member 47 is equivalent to the light transmissive substrate according to the present disclosure.

As explained above, on the heat receiving substrate 52 and the heat radiating substrate 53, the joining portion CN where the heat receiving substrate 52 and the heat radiating substrate 53 are jointed to each other is provided on the outer side of the hollow space SP in which the working fluid is encapsulated. The dimension from the outer side end face of the joining portion CN to the hollow space SP in a direction orthogonal to a direction in which the heat receiving substrate 52 and the heat radiating substrate 53 are connected is larger than the dimension from the outer side end face of the heat receiving substrate 52 to the hollow space SP in the direction in which the heat receiving substrate 52 and the heat radiating substrate 53 are connected. For example, as shown in FIG. 19, a distance L1 between the outer side end face crossing in the +Y direction P in the joining portion CN and the hollow space SP is longer than a distance L2 between the surface of the heat receiving substrate 52 forming the inner edge of the opening 54 in the bent part 58 and the hollow space SP.

Accordingly, the bent parts 58 form the inner edge of the opening 54 and the heat receiving substrate 52 and the end faces 471 of the second dustproof member 47 are thermally connected at the inner edge of the opening 54, whereby it is possible to make it easier to transmit the heat from the second dustproof member 47 to the heat receiving substrate 52 compared with when the end faces of the heat receiving substrate 52 and the heat radiating substrate 53 in the joining portion CN are thermally connected to the end faces 471. Therefore, since it is possible to cause the working fluid in the liquid phase to easily change to the working fluid in the gas phase with the heat transmitted from the cooling member 5C, it is possible to improve the cooling efficiency of the liquid crystal layer 42.

Fourth Embodiment

A fourth embodiment of the present disclosure is explained below.

A projector according to this embodiment includes the same components as the components of the projector 1 according to the first embodiment but is different in that the cooling member further includes heat radiating fins on the upstream of the cooling gas with respect to the opening. In the following explanation, the same or substantially the same portions as the portions explained above are denoted by the same reference numerals and signs and explanation of the portions is omitted.

Schematic Configuration of the Projector

Figure 20:
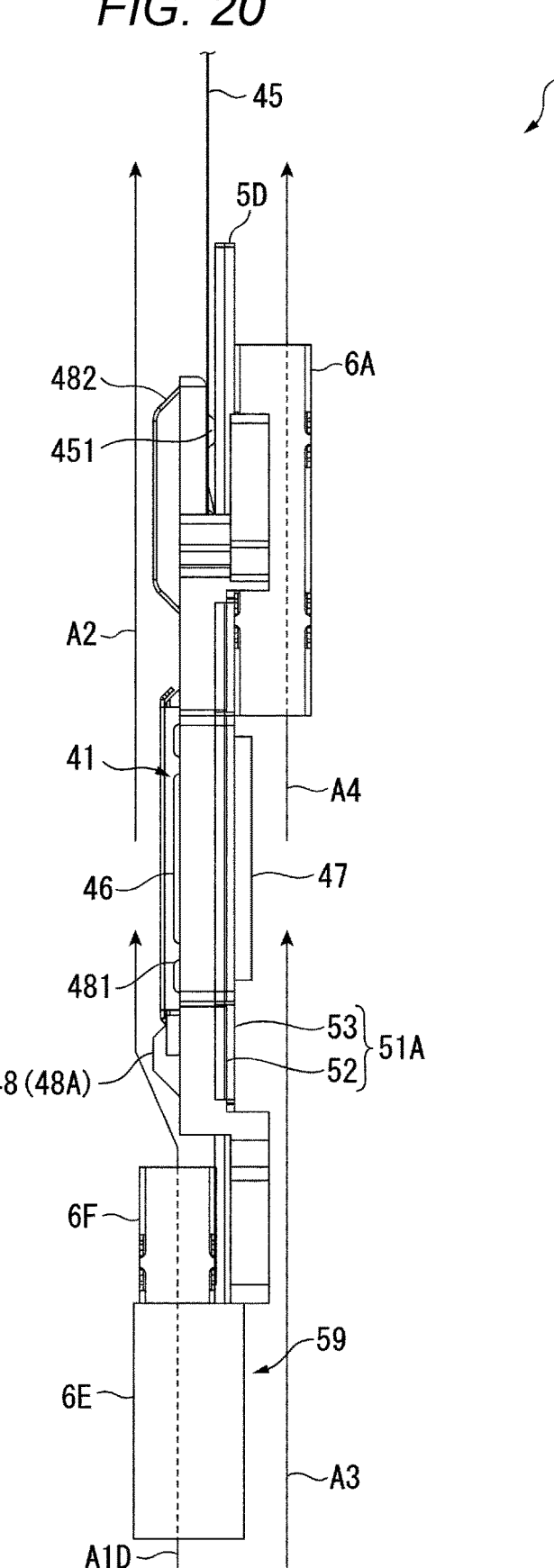
FIG. 20 is a side view showing a light modulation device included in a projector according to a fourth embodiment.

FIG. 20 is a side view showing a light modulation device 4D included in the projector according to this embodiment. In other words, FIG. 20 is a schematic diagram showing a flow of the cooling gas to the light modulation device 4D.

The projector according to this embodiment includes the same components and the same functions as the components and the functions of the projector 1 according to the first embodiment except that the projector includes the light modulation device 4D shown in FIG. 20 instead of the light modulation device 4A according to the first embodiment. Three light modulation devices 4D include the light modulation device 4D that modulates red light, the light modulation device 4D that modulates green light, and the light modulation device 4D that modulates blue light.

The light modulation device 4D includes the same components and the same functions as the components and the functions of the light modulation device 4A except that the light modulation device 4D includes a cooling member 5D instead of the cooling member 5A according to the first embodiment.

Configuration of the Cooling Member

The cooling member 5D includes the same components and the same functions as the components and the functions of the cooling member 5A according to the first embodiment except that the cooling member 5D includes a second condensing part 59, a heat transmitting member 6E, and a second heat radiating member 6F. In this embodiment, the cooling member 5D is explained as including the main body 51A. However, a main body included in the cooling member 5D may be the main body 51C according to the third embodiment.

The second condensing part 59 is provided on the opposite side of the first condensing part 57 with respect to the pixel arrangement region AR on the heat radiating substrate 53. That is, the second condensing part 59 is provided in the −Y direction, which is the opposite side of the first condensing part 57 with respect to the opening 54 on the heat radiating substrate 53. Like the first condensing part 57, the second condensing part 59 condenses the working fluid in the gas phase circulating in the hollow space SP into the working fluid in the liquid phase. The second heat radiating member 6F is thermally connected to the second condensing part 59.

The heat transmitting member 6E is connected to a portion of the heat radiating substrate 53 corresponding to the second condensing part 59 and is connected to the second heat radiating member 6F. The heat transmitting member 6E transmits the heat of the working fluid in the gas phase received by the second condensing part 59 to the second heat radiating member 6F. Such a heat transmitting member 6E is formed of, for example, metal having satisfactory thermal conductivity.

The second heat radiating member 6F is thermally connected to the second condensing part 59 via the heat transmitting member 6E. Further, the second heat radiating member 6F is thermally connected to the outer surface in the +Z direction of the heat radiating substrate 53 corresponding to the second condensing part 59. The second heat radiating member 6F is provided on the opposite side of the first heat radiating member 6A with respect to the opening 54 and is provided on the opposite side of the first heat radiating member 6A with respect to the main body 51A. That is, the second heat radiating member 6F is disposed in the −Y direction with respect to the first heat radiating member 6A and the opening 54 and is disposed in the −Z direction with respect to the first heat radiating member 6A. Specifically, the second heat radiating member 6F is provided in the −Z direction in the light modulation device 4D and attached to the holding housing 48.

In this embodiment, the second heat radiating member 6F has the same configuration as the configuration of the first heat radiating member 6A according to the first embodiment. However, the second heat radiating member 6F may have the same configuration as the configuration of one of the first heat radiating member 6B according to the first embodiment and the first heat radiating members 6C and 6D according to the second embodiment.

Flow of the Cooling Gas Circulating to the Light Modulation Device

As in the light modulation device 4A according to the first embodiment, a part of the cooling gas A3 circulating in the +Y direction from the first circulating parts 73 flows in a space in the +Z direction with respect to the light modulation device 4D and cools the cooling member 5D and the second dustproof member 47. Consequently, a part of the heat of the liquid crystal layer 42 is radiated.

When the first heat radiating member 6C or the first heat radiating member 6D according to the second embodiment is adopted in the light modulation device 4D and the cooling device 7B according to the second embodiment is adopted in the projector, the cooling gases A4 and A5 circulate to the first heat radiating member 6C.

Another cooling gas A1D circulating in the +Y direction from the first circulating parts 73 circulates in the −Z direction with respect to the light modulation device 4D. Specifically, the cooling gas A1D circulates in the +Y direction along a channel provided on the inside of the second heat radiating member 6F. Consequently, the heat transmitted from the second condensing part 59 is transmitted to the cooling gas A1D by the second heat radiating member 6F. Consequently, a part of the heat of the liquid crystal layer 42 is radiated.

The cooling gas A1D having circulated in the second heat radiating member 6F circulates in the +Y direction along the surface 48A in the −Z direction in the holding housing 48 and cools the holding housing 48 and circulates along the first dustproof member 46 and cools the first dustproof member 46. Consequently, a part of the heat of the liquid crystal layer 42 is radiated.

The cooling gas A2 having cooled the first dustproof member 46 further circulates in the +Y direction and cools the heat radiating fins 482. Consequently, a part of the heat of the liquid crystal layer 42 is radiated.

In the light modulation device 4D, the second condensing part 59 is provided on the opposite side of the first condensing part 57 with respect to the opening 54. That is, the second condensing part 59 is provided in the −Y direction with respect to the opening 54. The second dustproof member 47 disposed to correspond to the pixel arrangement region AR is fit in the opening 54.

Accordingly, when the −Y direction is a direction indicating the vertical direction upper side in the light modulation device 4D, it is possible to make it easy to transport the working fluid in the liquid phase condensed by the second condensing part 59 to the connecting portion to the second substrate 44 and the connecting portion to the second dustproof member 47 on the heat receiving substrate 52 not only with a capillary force of the mesh structure MS but also with the gravity. Consequently, it is possible to promote the phase change of the working fluid from the liquid phase to the gas phase on the heat receiving substrate 52 with the heat transmitted from the liquid crystal layer 42 via the second substrate 44 and the second dustproof member 47. That is, it is possible to improve the heat radiation efficiency of the heat of the liquid crystal layer 42 and cooling efficiency of the liquid crystal layer 42.

When the +Y direction is the direction indicating the vertical direction upper side in the light modulation device 4A, as explained above, it is possible to make it easy to transport the working fluid in the liquid phase condensed by the first condensing part 57 to the connecting portion to the second substrate 44 and the connecting portion to the second dustproof member 47 on the heat receiving substrate 52 not only with the capillary force of the mesh structure MS but also with the gravity. Consequently, it is possible to promote the phase change of the working fluid from the liquid phase to the gas phase on the heat receiving substrate 52 with the heat transmitted from the liquid crystal layer 42 via the second substrate 44 and the second dustproof member 47.

Effects of the Fourth Embodiment

The projector according to this embodiment explained above achieves effects described blow besides achieving the same effects as the effects of the projector 1 according to the first embodiment.

In the light modulation device 4D of the projector according to the fourth embodiment, the cooling member 5D includes the second condensing part 59 and the second heat radiating member 6F. The second condensing part 59 is provided on the opposite side of the first condensing part 57 with respect to the pixel arrangement region AR on the heat radiating substrate 53. In other words, the second condensing part 59 is provided on the opposite side of the first condensing part 57 with respect to the opening 54 on the heat radiating substrate 53. The second condensing part 59 condenses the working fluid in the gas phase circulating in the hollow space SP into the working fluid in the liquid phase. The second heat radiating member 6F is thermally connected to the outer surface of the heat radiating substrate 53 corresponding to the second condensing part 59 via the heat transmitting member 6E.

With such a configuration, the first condensing part 57 and the second condensing part 59 are disposed to sandwich the pixel arrangement region AR and the opening 54 and the first heat radiating member 6A and the second heat radiating member 6F are disposed to sandwich the pixel arrangement region AR. Consequently, it is possible to expand a heat radiation area of the heat of the liquid crystal layer 42 transmitted to the cooling member 5D.

When the first condensing part 57 is disposed further on the upper side than the second condensing part 59, it is possible to make it easy to circulate, with the gravity, the working fluid condensed from the gas phase into the liquid phase by the first condensing part 57 to a portion to which the heat of the liquid crystal layer 42 is transmitted on the heat receiving substrate 52. Similarly, when the second condensing part 59 is disposed further on the upper side than the first condensing part 57, it is possible to make it easy to circulate, with the gravity, the working fluid condensed from the gas phase into the liquid phase by the second condensing part 59 to the portion to which the heat of the liquid crystal layer 42 is transmitted on the heat receiving substrate 52. Therefore, it is possible to make it easy to change the working fluid in the liquid phase to the working fluid in the gas phase with the heat of the liquid crystal layer 42 and improve the cooling efficiency of the liquid crystal layer 42.

In the light modulation device 4D, the first heat radiating member 6A and the second heat radiating member 6F are disposed on the opposite sides each other with respect to the heat receiving substrate 52 and the heat radiating substrate 53.

With such a configuration, the first heat radiating member 6A and the second heat radiating member 6F can be individually cooled by the cooling gas circulating in a space in the −Z direction with respect to the light modulation device 4D and the cooling gas circulating in a space in the +Z direction with respect to the light modulation device 4D. Consequently, it is possible to improve cooling efficiency of the first heat radiating member 6A and the second heat radiating member 6F. Since the pixel arrangement region AR is disposed upstream in a channel of the cooling gas circulating to the first heat radiating member 6A, the pixel arrangement region AR can be cooled by the cooling gas A3 before cooling the first heat radiating member 6A. Therefore, it is possible to improve the cooling efficiency of the liquid crystal layer 42.

Modifications of the Embodiments

The present disclosure is not limited to the embodiments explained above. Modifications, improvements, and the like in a range in which the object of the present disclosure can be attained are included in the present disclosure.

In the embodiments, the cooling members 5A, 5B, 5C, and 5D are the vapor chambers that include the heat receiving substrate 52 and the heat radiating substrate 53 and in which the working fluid is encapsulated in the hollow space SP provided on the inside. However, not only this, but the cooling member according to the present disclosure may have other configurations if the cooling member changes a phase state of the working fluid encapsulated on the inside to thereby transport the transmitted heat to a heat radiating part apart from a heat receiving part and radiate the heat with the heat radiating part.

In the embodiments, the cooling members 5A, 5B, 5C, and 5D are thermally connected to the second substrate 44 disposed on the light emission side with respect to the liquid crystal layer 42. However, not only this, but the cooling member may be thermally connected to the first substrate 43 disposed on the light incident side with respect to the liquid crystal layer 42.

In the embodiments, the cooling members aA, 5B, 5C, and 5D include the opening 54. However, not only this, but the opening may not be provided in the cooling member. In this case, the panel main body configuring the light modulation device may be configured not as a transmissive liquid crystal panel, a light incident surface and a light emission surface of which are different, but as a reflective liquid crystal panel, a light incident surface and a light emission surface of which are the same. The second dustproof member 47 functioning as the light transmissive substrate fit in the opening 54 may be absent. Further, the inner edge of the opening 54 and the second dustproof member 47 may not be directly connected and may be thermally connected via a heat transmitting member having thermal conductivity.

In the embodiments, the heat receiving substrate 52 includes the mesh structure MS that is provided in the hollow space SP and into which the working fluid in the liquid phase soaks. The heat radiating substrate 53 includes the plurality of columnar bodies PL that are provided in the hollow space SP and forms the channels in which the working fluid in the gas phase circulates. However, not only this, but the heat receiving substrate 52 may not include the mesh structure MS and the heat radiating substrate 53 may not include the plurality of columnar bodies PL. That is, the configuration of the heat receiving substrate and the configuration of the heat radiating substrate according to the present disclosure are not limited to the configurations explained above.

In the embodiments, the driver circuit 451, which is the circuit element provided on the printed board 45, is thermally connected to the heat receiving substrate 52. However, not only this, but the driver circuit 451 may not be thermally connected to the heat receiving substrate 52. The driver circuit 451 may be thermally connected to the heat receiving substrate 52 via a heat transmitting member. Further, the driver circuit 451 may be provided on the surface of the printed board 45 on the opposite side of the heat receiving substrate 52 side or may be provided in a portion to which the cooling gas circulates.

In the embodiments, the cooling members 5A, 5B, 5C, and 5D includes the first condensing part 57 that are provided on the heat radiating substrate 53 and condenses the working fluid in the gas phase circulating in the hollow space SP into the working fluid in the liquid phase and the first heat radiating members 6A, 6B, 6C, and 6D provided in positions corresponding to the first condensing part 57 on the outer surface of the heat radiating substrate 53. However, not only this, but the first heat radiating member may be absent. The first heat radiating member may not always be provided on the heat radiating substrate 53 and may be provided in a position apart from the light modulation device. In this case, the first heat radiating member and the first condensing part 57 only have to be thermally connected via the heat transfer member.

In the embodiments, the holding housing 48 combined with the cooling members 5A, 5B, 5C, and 5D includes the position adjusting part 483 into which the inserting part 359 of the holding member 357 is inserted and that adjusts the positions of the light modulation devices 4A, 4B, 4C, and 4D with respect to the incident surfaces of the color combining system 356. However, not only this, but the cooling member may include the position adjusting part 483. The holding housing and the cooling member may not include the position adjusting part. The holding member may hold the light modulation device to thereby adjust the position of the light modulation device with respect to the incident surfaces of the color combining system.

In the embodiments, the cooling devices 7A and 7B includes the first circulating parts 73 that circulate the cooling gas in the +Y direction from the pixel arrangement region AR toward the first heat radiating members 6A, 6B, 6C, and 6D. The +Y direction is equivalent to the first direction. However, not only this, but the cooling gas circulating with respect to the light modulation device may circulate in the +X direction or may circulate in the +Z direction.

The cooling device 7B includes the cooling fan 71 and the duct 72 in which the first circulating parts 73 are provided. However, not only this, but, in the cooling device, the cooling fan may directly feed the cooling gas to the light modulation device. That is, the duct 72 may be absent.

In the second embodiment, the cooling device 7B includes the first circulating parts 73 that circulate the cooling gas in the +Y direction with respect to the light modulation device 4B and the second circulating part 75 that circulates the cooling gas in the +X direction with respect to the light modulation device 4B. However, not only this, but directions in which the cooling device circulates the cooling gas may be two directions selected from the +X direction, the +Y direction, and the +Z direction. Further, the cooling devices 7A and 7B may circulate the cooling gas in the −X direction, the −Y direction, and the −Z direction with respect to the light modulation device.

The cooling device 7B includes the cooling fan 71 and the duct 74 in which the first circulating parts 73 and the second circulating part 75 are provided. However, not only this, but, in the cooling device, the cooling fan may directly feed the cooling gas to the light modulation device. That is, the duct 74 may be absent.

In the third embodiment, the main body 51C of the cooling member 5C includes the bent parts 58 bent to the opposite side of the second substrate 44 from the second substrate 44 side. That is, the main body 51C includes the bent parts 58 bent in the +Z direction. The heat radiating substrates 53 are connected to each other in the bent parts 58. That is, the bent parts 58 are configured by bending parts of the main body 51C at 180°. However, not only this, but the bent parts 58 may be configured by bending parts of the main body 51C at an angle equal to or smaller than 180°. For example, the bent parts 58 may be configured by bending parts of the main body 51C at 90°.

In the fourth embodiment, the second condensing part 59 is provided on the opposite side of the first condensing part 57 across the pixel arrangement region AR. That is, the second condensing part 59 is provided on the opposite side of the first condensing part 57 across the opening 54. However, not only this, but the second condensing part 59 may be disposed on the same side as the first condensing part 57 with respect to the pixel arrangement region AR and the opening 54.

The second heat radiating member 6F is thermally connected to the second condensing part 59. However, the second heat radiating member 6F may be absent. The second heat radiating member 6F may be provided in a position corresponding to the second condensing part 59 on the outer surface in the +Z direction on the heat radiating substrate 53. That is, the heat transmitting member that thermally connects the heat radiating substrate and the second heat radiating member may be absent. The second heat radiating member may be disposed on the same side as the first heat radiating member with respect to the heat radiating substrate 53.

Overview of the Present Disclosure

An overview of the present disclosure is added below.

Alight modulation device according to a first aspect of the present disclosure is a light modulation device including a pixel arrangement region in which a plurality of pixels are arranged, the light modulation device including: a first substrate; a second substrate disposed to be opposed to the first substrate via a liquid crystal layer; and a cooling member disposed on an opposite side of the first substrate with respect to the second substrate and thermally connected to the second substrate. The cooling member includes a hollow space in which working fluid is encapsulated and changes the working fluid in a liquid phase to the working fluid in a gas phase to thereby cool the liquid crystal layer via the second substrate.

With such a configuration, since the heat of the liquid crystal layer is transmitted to the second substrate, the heat of the liquid crystal layer is transmitted to the cooling member via the second substrate. The cooling member changes the working fluid in the liquid phase encapsulated in the internal apace to the working fluid in the gas phase with the transmitted heat and consumes the heat of the liquid crystal layer to thereby cool the liquid crystal layer. Consequently, since the heat of the liquid crystal layer transmitted to the cooling member can be efficiently consumed, the liquid crystal layer can be efficiently cooled. Therefore, even in the light modulation device having a small pixel arrangement region, it is possible to improve cooling efficiency of the liquid crystal layer. Consequently, it is possible to increase an amount of light made incident on the light modulation device and achieve extension of the life of the light modulation device.

Since cooling efficiency of the light modulation device can be improved, when the light modulation device is cooled by the cooling gas circulated by the cooling fan, a flow rate of the cooling gas circulating to the light modulation device can be reduced. Accordingly, even when a small fan is adopted as the cooling fan, since a flow rate of the cooling gas sufficient for the cooling of the light modulation device can be secured, it is possible to achieve a reduction in the size of the projector including the light modulation device and the cooling fan. On the other hand, when a large fan is adopted as the cooling fan, since the number of revolutions per unit time of the cooling fan can be reduced, it is possible to reduce noise of the projector.

Further, since the cooling efficiency of the light modulation device can be improved, the light modulation device can be reduced in size. Therefore, when the light modulation device according to the present disclosure is adopted in the projector, it is possible to adopt the projection optical device small in size in the projector and reduce the projector in size.

In the first aspect, the cooling member may include: a heat receiving substrate connected to the second substrate and configured to change the working fluid in the liquid phase to the working fluid in the gas phase with heat transmitted from the second substrate; and a heat radiating substrate joined to the heat receiving substrate on an opposite side of the second substrate with respect to the heat receiving substrate and configured to form the hollow space in conjunction with the heat receiving substrate and radiate heat of the working fluid in the gas phase and condense the working fluid in the gas phase into the working fluid in the liquid phase.

With such a configuration, the cooling member can be configured as a vapor chamber. The heat receiving substrate is connected to the second substrate, whereby the working fluid in the liquid phase can be efficiently changed to the working fluid in the gas phase by the transmitted heat. The heat radiating substrate is disposed on the opposite side of the second substrate with respect to the heat receiving substrate, whereby the heat of the working fluid in the gas phase can be efficiently radiated and the working fluid in the gas phase can be efficiently condensed into the working fluid in the liquid phase. Therefore, it is possible to efficiently radiate the heat of the liquid crystal layer transmitted to the cooling member and improve the cooling efficiency of the liquid crystal layer.

In the first aspect, the light modulation device may further include a light transmissive substrate provided in a portion of the second substrate corresponding to the pixel arrangement region, the cooling member may include an opening in which the light transmissive substrate is fit, and an inner edge of the opening may be thermally connected to a side surface of the light transmissive substrate.

With such a configuration, the light modulation device can be configured as a transmissive light modulation device in which light can be transmitted through the pixel arrangement region. The inner edge of the opening through which the light can pass in the cooling member and the end face of the light transmissive substrate provided to correspond to the pixel arrangement region on the second substrate are thermally connected. Consequently, the heat of the liquid crystal layer transmitted to the second substrate is not only directly transmitted to the cooling member from the second substrate but also transmitted from the second substrate via the light transmissive substrate. Accordingly, since transmission routes for the heat of the liquid crystal layer to the cooling member can be increased, even when the cooling member includes the opening, it is possible to efficiently transmit the heat of the liquid crystal layer to the cooling member. Therefore, it is possible to improve the cooling efficiency of the liquid crystal layer.

In the first aspect, the cooling member may include bent parts bent to an opposite side of the second substrate from the second substrate side, the bent parts may form the inner edge of the opening, and the heat receiving substrate may be thermally connected to the side surface of the light transmissive substrate.

On the heat receiving substrate and the heat radiating substrate, a joining portion where the heat receiving substrate and the heat radiating substrate are joined to each other is provided on the outer side of the hollow space in which the working fluid is encapsulated. The dimension from an outer side end face of a joining part to an internal space in a direction orthogonal to a direction in which the heat receiving substrate and the heat radiating substrate are connected is larger than the dimension from an outer side end face of the heat receiving substrate to the internal space in the direction in which the heat receiving substrate and the heat radiating substrate are connected.

Accordingly, the bent parts form the inner edge of the opening and the end faces of the heat receiving substrate and the light transmissive substrate are thermally connected at the inner edge of the opening, whereby it is possible to make it easier to transmit the heat from the light transmissive substrate to the heat receiving substrate compared with when the end faces of the heat receiving substrate and the heat radiating substrate in the joining portion are thermally connected to the end face of the light transmissive substrate. Therefore, since it is possible to make it easy to change the working fluid in the liquid phase to the working fluid in the gas phase with the heat transmitted to the cooling member, it is possible to improve the cooling efficiency of the liquid crystal layer.

In the first aspect, the heat receiving substrate may include a mesh structure that is provided in the hollow space and into which the working fluid in the liquid phase soaks, and the heat radiating substrate may include a plurality of columnar bodies that are provided in the hollow space and form channels in which the working fluid in the gas phase circulates.

With such a configuration, since it is possible to make it easy to cause the heat receiving substrate to hold the working fluid in the liquid phase, it is possible to make it easy to change the working fluid in the liquid phase to the working fluid in the gas phase with the heat transmitted to the heat receiving substrate. Since the heat radiating substrate includes the plurality of columnar bodies, it is possible to increase the strength of the cooling member and make it easy to circulate the working fluid in the gas phase to a portion where the working fluid is changed from the gas phase to the liquid phase. Therefore, it is possible to promote the phase change of the working fluid in the cooling member and improve the cooling efficiency of the liquid crystal layer.

In the first aspect, the light modulation device may further include: a printed board extending from the first substrate and the second substrate; and a circuit element provided on the printed board, and the circuit element may be thermally connected to the heat receiving substrate.

With such a configuration, since heat generated by the circuit element can be transmitted to the heat receiving substrate, the circuit element can be cooled by the cooling member. Therefore, since it is unnecessary to separately provide a component that cools the circuit element, it is possible to suppress the configuration of the light modulation device from being complicated.

In the first aspect, the cooling member may include: a first condensing part provided on the heat radiating substrate and configured to condense the working fluid in the gas phase circulating in the hollow space into the working fluid in the liquid phase; and a first heat radiating member provided on an outer surface of the heat radiating substrate corresponding to the first condensing part, and the first heat radiating member may radiate heat transmitted from the working fluid in the gas phase.

With such a configuration, the first heat radiating member radiates the heat transmitted from the working fluid in the gas phase, whereby it is possible to promote the condensation of the working fluid in the gas phase into the working fluid in the liquid phase in the first condensing part and promote the change from the working fluid in the liquid phase to the working fluid in the gas phase by the transmitted heat of the liquid crystal layer. Therefore, since it is possible to improve heat radiation efficiency of the heat of the liquid crystal layer, it is possible to improve the cooling efficiency of the liquid crystal layer.

In the first aspect, the cooling member may include: a second condensing part provided on an opposite side of the first condensing part with respect to the pixel arrangement region on the heat radiating substrate and configured to condense the working fluid in the gas phase circulating in the hollow space into the working fluid in the liquid phase; and a second heat radiating member thermally connected to an outer surface of the heat radiating substrate corresponding to the second condensing part.

With such a configuration, the first condensing part and the second condensing part are disposed to sandwich the pixel arrangement region, and the first heat radiating member and the second heat radiating member are disposed to sandwich the pixel arrangement region. Consequently, it is possible to expand a heat radiation area for the heat of the liquid crystal layer transmitted to the cooling member. When the first condensing part is disposed further on the upper side than the second condensing part, it is possible to make it easy to circulate, with the gravity, the working fluid condensed from the gas phase into the liquid phase by the first condensing part to a portion to which the heat of the liquid crystal layer is transmitted on the heat receiving substrate. Similarly, when the second condensing part is disposed further on the upper side than the first condensing part, it is possible to make it easy to circulate, with the gravity, the working fluid condensed from the gas phase into the liquid phase by the second condensing part to the portion to which the heat of the liquid crystal layer is transmitted on the heat receiving substrate. Therefore, it is possible to make it easy to change the working fluid in the liquid phase to the working fluid in the gas phase with the heat of the liquid crystal layer and improve the cooling efficiency of the liquid crystal layer.

In the first aspect, the first heat radiating member and the second heat radiating member may be disposed on opposite sides each other with respect to the heat receiving substrate and the heat radiating substrate.

With such a configuration, when the cooling gas circulates to each of a space on the opposite side of the heat radiating substrate with respect to the heat receiving substrate and a space on the opposite side of the heat receiving substrate with respect to the heat radiating substrate, it is possible to individually cool the first heat radiating member and the second heat radiating member with the cooling gas circulating in the spaces. Consequently, it is possible to improve cooling efficiency of the first heat radiating member and the second heat radiating member. Since the pixel arrangement region is disposed upstream in a channel of the cooling gas circulating to one heat radiating member of the first heat radiating member and the second heat radiating member, it is possible to cool the pixel arrangement region with the cooling gas before cooling the one heat radiating member. Therefore, it is possible to improve the cooling efficiency of the liquid crystal layer.

In the first aspect, the light modulation device may further include a holding housing combined with the cooling member and configured to hold the liquid crystal layer, the first substrate, and the second substrate on an inside, and the holding housing may include a position adjusting part for adjusting a position of the holding housing.

With such a configuration, the heat transmitted from the liquid crystal layer can be radiated by the holding housing. Consequently, it is possible to expand the heat radiation area for the heat of the liquid crystal layer.

Since the holding housing includes the position adjusting part, it is unnecessary to provide the same position adjusting part in the cooling member combined with the holding housing. Consequently, since it is possible to suppress a load from being applied to the cooling member, it is possible to cause the cooling member to stably function.

A projector according to a second aspect of the present disclosure includes: a light source; the light modulation device according to the first aspect configured to modulate light emitted from the light source; and a projection optical device configured to project the light modulated by the light modulation device.

With such a configuration, it is possible to achieve the same effects as the effects of the light modulation device according to the first aspect.

A projector according to a third aspect of the present disclosure includes: a light source; the light modulation device according to the first aspect configured to modulate light emitted from the light source; a projection optical device configured to project the light modulated by the light modulation device; and a cooling device configured to circulate a cooling gas to the cooling member. The cooling device includes a first circulating part configured to circulate the cooling gas in a first direction from the pixel arrangement region toward the first heat radiating member.

With such a configuration, it is possible to achieve the same effects as the effects of the light modulation device according to the first aspect. The pixel arrangement region and the first heat radiating member can be cooled by the cooling gas circulated in the first direction by the cooling device. At this time, since the pixel arrangement region is disposed upstream in a channel of the cooling gas with respect to the first heat radiating member, it is possible to circulate the cooling gas having lower temperature to the pixel arrangement region compared with when the pixel arrangement region is disposed downstream with respect to the first heat radiating member. Therefore, it is possible to improve cooling efficiency of the pixel arrangement region and improve the cooling efficiency of the liquid crystal layer.

In the third aspect, the cooling device may include a second circulating part configured to circulate the cooling gas to the first heat radiating member along a second direction crossing the first direction.

With such a configuration, in the first heat radiating member, it is possible to cause the cooling gas circulating in the first direction and the cooling gas circulating in the second direction to collide. Consequently, since a turbulent flow of the cooling gas can be generated in the first heat radiating member, it is possible to make it easy to cool the first heat radiating member. Therefore, it is possible to improve the heat radiation efficiency of the heat of the liquid crystal layer and improve the cooling efficiency of the liquid crystal layer.

In the third aspect, the first heat radiating member may include a plurality of fins in which the cooling gas can circulate along each of the first direction and the second direction.

With such a configuration, it is possible to generate a turbulent flow of the cooling gas among the plurality of fins. Therefore, it is possible to improve heat radiation efficiency of the heat by the first heat radiating member and improve the cooling efficiency of the liquid crystal layer.

What is claimed is:

1. A light modulation device comprising:
a panel including a pixel arrangement region in which a plurality of pixels are arranged;
a printed board extended from the panel in a first direction without folding back onto the panel, and driving the panel by an image signal; and
a vapor chamber in direct contact with the panel in a heat transferable manner, and including an extended portion extended from the panel in the first direction and a hollow space in which working fluid is encapsulated,
wherein the vapor chamber is changing, with the heat received, the working fluid in a liquid phase to the working fluid in a gas phase and changing, with the heat radiated, the working fluid in the gas phase to the working fluid in the liquid phase, the printed board overlaps, in a second direction different from the first direction, with the extended portion of the vapor chamber and the hollow space without overlapping with the panel, the printed board has a circuit element that controls operation of the panel, the circuit element is in direct contact with the vapor chamber, and the panel overlaps with the vapor chamber in the second direction.

2. The light modulation device according to claim 1, wherein the vapor chamber includes:

a heat receiving substrate connected to the panel; and a heat radiating substrate joined to the heat receiving substrate on opposite side of the panel with respect to the heat receiving substrate, the circuit element is thermally connected to the heat receiving substrate.

3. The light modulation device according to claim 1, further includes a heat radiating member disposed on the extended portion of the vapor chamber, the heat radiating member radiates heat transmitted from the working fluid in the gas phase.

4. The light modulation device according to claim 1, wherein the vapor chamber includes:

a heat receiving substrate connected to the panel; and a heat radiating substrate joined to the heat receiving substrate on opposite side of the panel with respect to the heat receiving substrate, the heat receiving substrate includes a mesh structure that is provided in the hollow space and into which the working fluid in the liquid phase soaks, and the heat radiating substrate includes a plurality of columnar bodies provided in the hollow space and forming channels in which the working fluid in the gas phase circulates.

5. A projector comprising:

the light modulation device according to claim 1 configured to modulate light emitted from a light source; and a projection optical device configured to project the light modulated by the light modulation device.

6. The projector according to claim 5, further include:

a cooling fan; and a duct circulated the cooling gas fed from the cooling fan to the light modulation device, the cooling gas fed from the duct circulate from the panel toward the printed board.

7. A light modulation device comprising:

a panel including a pixel arrangement region in which a plurality of pixels are arranged;

a printed board extended in a first direction from the panel without folding back onto the panel, and driving the panel by an image signal; and a vapor chamber in direct contact with the panel in a heat transferable manner, and including an extended portion extended from the panel and a hollow space in which working fluid is encapsulated, wherein the vapor chamber is changing, with the heat received, the working fluid in a liquid phase to the working fluid in a gas phase and changing, with the heat radiated, the working fluid in the gas phase to the working fluid in the liquid phase, the printed board extends from the panel in a first direction and overlapping, in a second direction different from the first direction, with the hollow space without overlapping with the panel, the extended portion of the vapor chamber extends from the panel in the first direction, the printed board has a circuit element that controls operation of the panel, the circuit element is in direct contact with the vapor chamber, and the panel overlaps with the vapor chamber in the second direction.

8. A projector comprising:

the light modulation device according to claim 7 configured to modulate light emitted from a light source; and a projection optical device configured to project the light modulated by the light modulation device.

9. The projector according to claim 8, further include:

a cooling fan; and a duct circulated the cooling gas fed from the cooling fan to the light modulation device, the cooling gas fed from the duct circulate from the panel toward the printed board.

* * * * *